US008770693B2

(12) United States Patent
Tanaka et al.

(10) Patent No.: US 8,770,693 B2
(45) Date of Patent: Jul. 8, 2014

(54) INK JET PRINTING APPARATUS AND PRINTING METHOD

(75) Inventors: Hirokazu Tanaka, Kawasaki (JP);
Tetsuya Edamura, Inagi (JP);
Toshiyuki Chikuma, Tokyo (JP);
Takatoshi Nakano, Yokohama (JP);
Wakako Yamamoto, Sagamihara (JP);
Kiichiro Takahashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 26 days.

(21) Appl. No.: 13/188,591

(22) Filed: Jul. 22, 2011

(65) Prior Publication Data

US 2012/0026227 A1 Feb. 2, 2012

(30) Foreign Application Priority Data

Jul. 30, 2010 (JP) .................. 2010-172568
Jul. 30, 2010 (JP) .................. 2010-172569
Jul. 15, 2011 (JP) .................. 2011-156835

(51) Int. Cl.
*B41J 29/38* (2006.01)
(52) U.S. Cl.
USPC .................. 347/12; 347/9; 347/14
(58) Field of Classification Search
USPC ..................... 347/12, 13, 9, 14, 41
See application file for complete search history.

(56) References Cited

U.S. PATENT DOCUMENTS 7,506,945 B2 * 3/2009 Noguchi .................. 347/12

FOREIGN PATENT DOCUMENTS

JP 200296455 A 4/2002
JP 2008168626 A 7/2008

OTHER PUBLICATIONS

U.S. Appl. No. 13/227,867, filed Sep. 8, 2011.

* cited by examiner

*Primary Examiner* — Lam S Nguyen
(74) *Attorney, Agent, or Firm* — Fitzpatrick, Cella, Harper & Scinto

(57) ABSTRACT

An ink jet printing apparatus and printing method are provided that can, without the addition of a special structure, suppress density imbalance between the print images formed by ink ejected from each of the ejection ports formed on a print head. As for the plurality of ejection ports, one portion of them are established as multiple impact ejection ports that form multiply impacted pixels at which the number of times ink is impacted at the same area is greater than at other pixels of the print area. And, print control is carried out such that more multiply impacted pixels are printed at print areas printed using ejection ports at the ends of the print head than at print areas printed without using ejection ports at the ends of the print head.

10 Claims, 40 Drawing Sheets

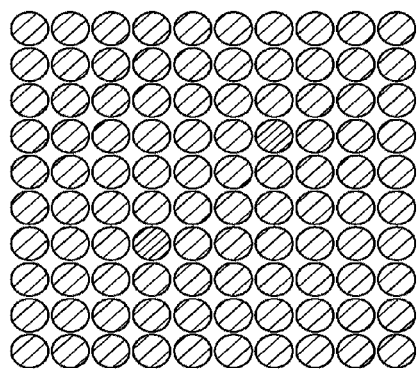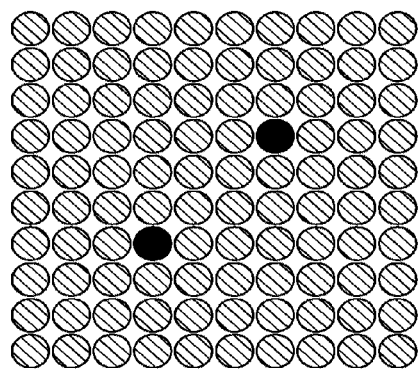
FIG.15A    FIG.15B

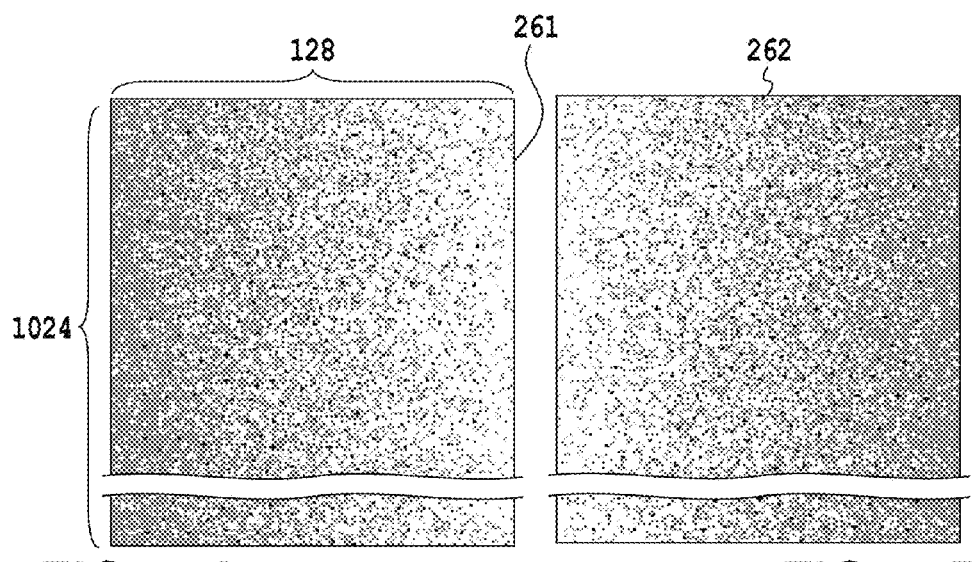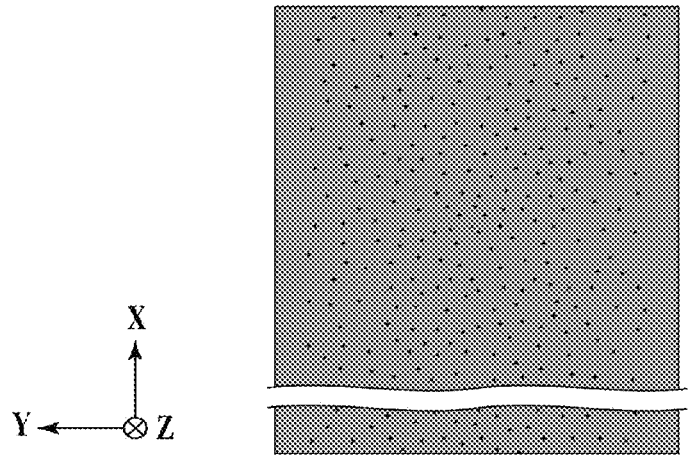
FIG.17A   FIG.17B   FIG.17C

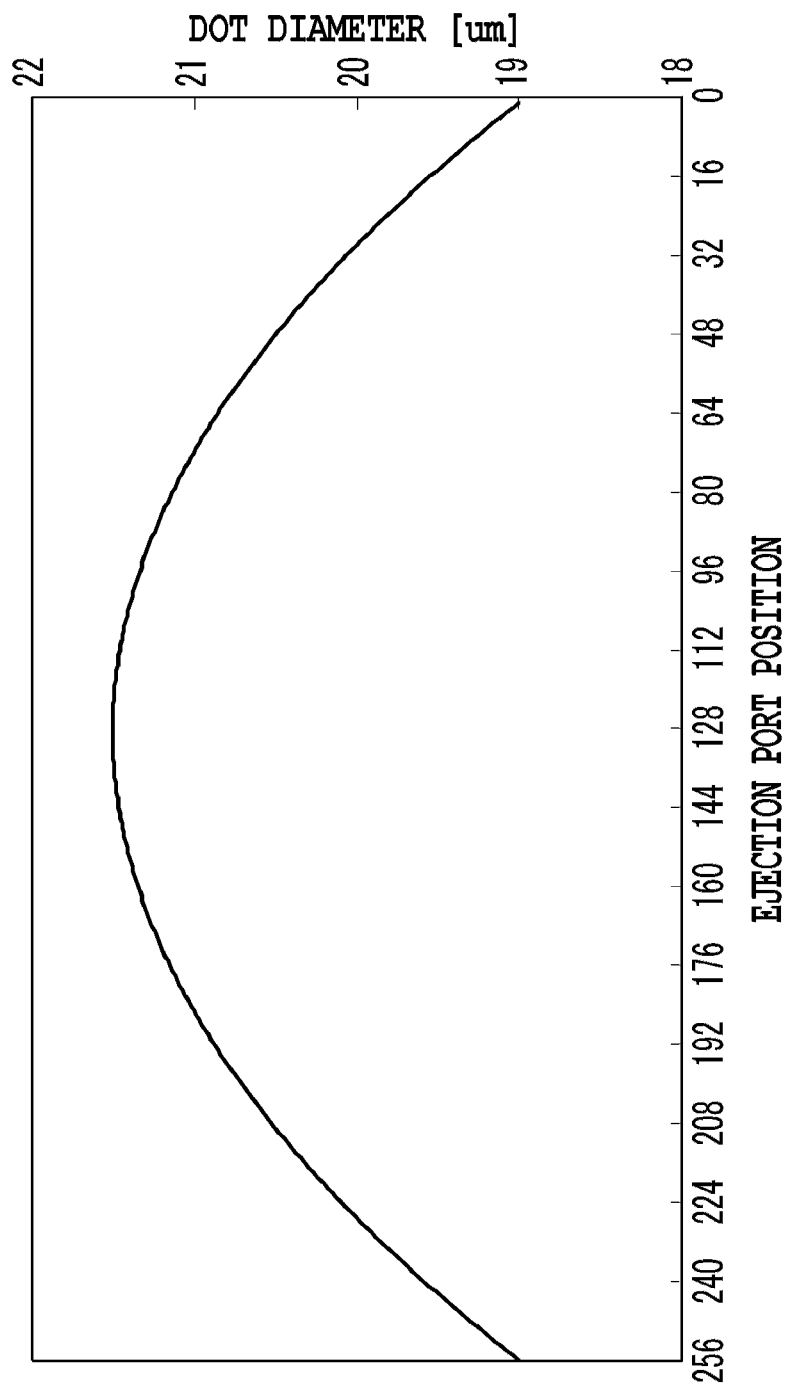

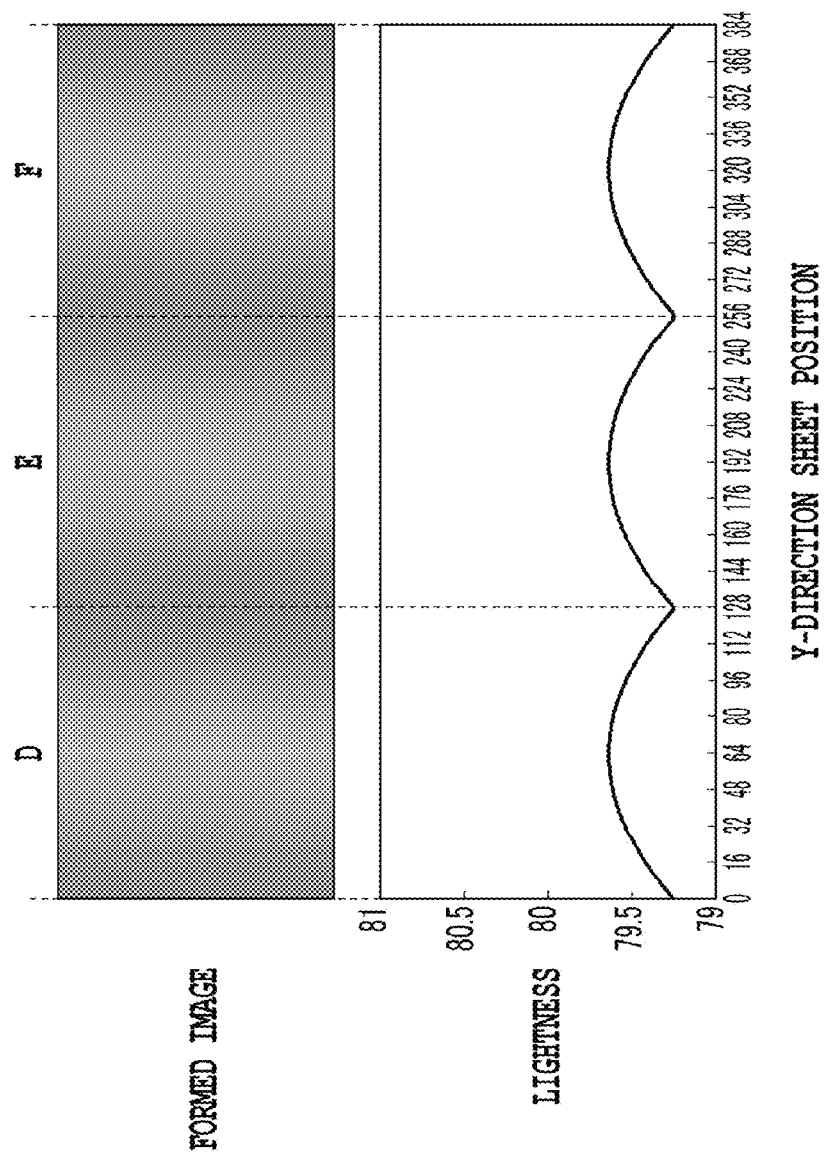

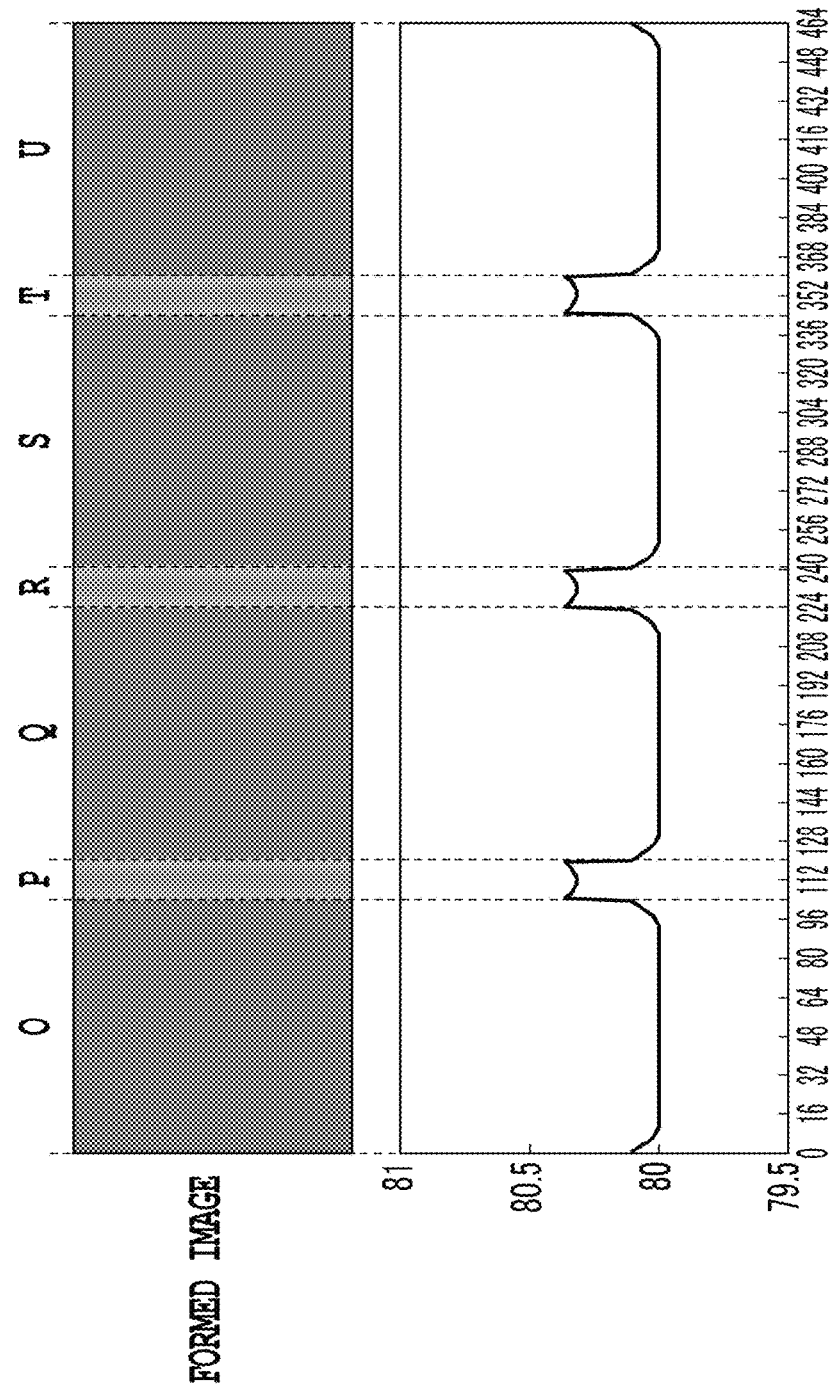

INK JET PRINTING APPARATUS AND PRINTING METHOD

BACKGROUND OF THE INVENTION

1. Field of the Invention

The invention relates to an ink jet printing apparatus and printing method for printing characters or images on a print medium according to print data.

2. Description of the Related Art

Ink jet printing apparatuses are capable of handling high speed, high image quality printing because they are capable of ejecting relatively minute ink drops at a relatively high frequency. Ink jet printing apparatuses are excellent in respect to these points, in comparison to other printing methods. Among ink jet printing apparatuses, thermal ink jet printing type printing apparatuses, which eject ink using bubbles generated in the ink via a heater (an electro-thermal converter), have ejection ports (nozzles) formed on them at a high density. Thus, thermal ink jet type printing apparatuses are capable of performing high resolution, high image quality printing.

Among ink jet printing apparatuses, there are serial scan type ink jet printing apparatuses that form print images by repeating main scans of the print head and sub-scans of the print medium. Miniaturization of these serial scan type ink jet printing apparatuses is relatively easy, and for this reason manufacturing costs are low, and they are generally widely available.

In the case where printing is carried out by a thermal ink jet printing method, when high duty printing with a high printing frequency, etc., is performed, temperature within the print head becomes nonuniform in the direction in which the ejection ports are aligned, due to differences in the amount of heat dissipation at each of the ejection port locations, etc. When ejection of ink is performed by a thermal ink jet printing method (referred to below simply as an ink jet printing method), ink is ejected via the bubble pressure caused by generating bubbles within the ink. In doing so, the growth rate of the generated bubbles is influenced by the temperature of the ink present in the vicinity of the bubbles. When ink temperature is high there are many molecules from within the ink that become vapor and form bubbles, and the bubbles grow comparatively large. Because the bubbles at the time of ink ejection become large, the amount of ejected ink becomes large. Thus, when temperature becomes nonuniform with respect to the direction of the ejection port array, the amount of ink ejection concurrently varies with respect to the direction of the ejection port array, and because of this print image density becomes nonuniform.

With respect to the above, up until now, various proposals have been disclosed in order to attempt to suppress variation of the ejection amount, within an ejection port array. As a method of suppressing the occurrence of a temperature range, which causes ejection amount variation, a method is known whereby nonuniformity of the temperature distribution within an ejection port array is reduced via heating, by adding an amount of energy, such that ink is not ejected from the ejection ports, into heaters which is not used for ink ejection. In Japanese Patent Laid-Open No. 2008-168626, in order to further suppress variation in the amount of ejection, within an ejection port array, temperature at the ends of the ejection port array is detected, the temperature distribution within the ejection port array is estimated from the detected result, and the pulse width applied to the heaters is varied for each ejection port in accordance with the estimated temperature distribution. According to this method it is possible to suppress variation of the amount ejected within an ejection port array because, for each of the ejection ports of differing temperatures, it is possible to establish a driving pulse that is sufficient for a target ejection amount.

In the above method, however, because the detection of the temperature at both ends of the ejection port array is a prerequisite, a new structure becomes necessary in order to detect temperature. Also, in contrast to the structure of a general ink jet printing apparatus in which all of the ejection ports formed on the print head are heat driven with a pulse of the same width, a new structure is necessary in which differing pulse widths can be established for each of the heaters corresponding to the ejection ports, according to the detected temperature. When the above points are taken into account, apparatus complexity and cost increase are associated with performing printing according to the method disclosed in Japanese Patent Laid-Open No. 2008-168626.

SUMMARY OF THE INVENTION

Therefore, taking into account the above considerations, it is an object of this invention to provide an ink jet printing apparatus and printing method that can, without the addition of a special structure, suppress density imbalance between the print images formed by ink ejected from each of the ejection ports formed on a print head.

According to an aspect of the present invention, there is provided an ink jet printing method for printing an image at a first area on a print medium and an image at second area on the print medium having the same size as the first area, by causing a print head, on which a plurality of ejection ports that eject ink are arranged, to scan a plurality of times each with respect to the first area and the second area, comprising: a first generation step that generates print data for each of the plurality of scans of the print head at the first area, based on image data corresponding to the image to be printed at the first area, at which printing is performed, at least 1 scan among the plurality of scans of the print head, using an ejection port group that includes ejection ports at ends of an array of the plurality of ejection ports of the print head, and based on a first mask pattern group that contains a plurality of mask patterns; a second generation step that generates print data for each of the plurality of scans of the print head at the second area, based on image data corresponding to the image to be printed at the second area, at which printing is performed, at all scans among the plurality of scans of the print head, using an ejection port group that does not include the ejection ports at the ends of the array of the plurality of ejection ports of the print head, and based on a second mask pattern group that contains a plurality of mask patterns; a first printing step that performs printing at the first area by a plurality of scans, based on the print data generated at the first generation step; and a second printing step that performs printing at the second area by a plurality of scans, based on the print data generated at the second generation step; wherein the number of pixels, among a plurality of pixels included in a print image corresponding to the print data generated at the first generation step, that are permitted to be printed by at least 2 mask patterns in a process using the first mask pattern group, is larger than the number of pixels, among the plurality of pixels included in a print image corresponding to the print data generated at the second generation step, that are permitted to be printed by at least 2 mask patterns in a process using the second mask pattern group.

According to an aspect of the present invention, there is provided an ink jet printing method for printing an image at a unit area on a print medium, by causing a print head, on which a plurality of ejection ports that eject ink are aligned, to scan the unit area 2 times in a scan direction that crosses the direction of the ejection port array, comprising: a generation step that generates first print data and second print data for printing at each of the scans, based on image data to be printed at the unit area; a printing step that performs printing at the unit area by the 2 scans of the print head, based on print pixel data generated at the generation step; wherein, in data that can be obtained by performing a logical AND operation between the first print data and the second print data, more pixels are contained at the ends of the scanning direction than pixels that are contained at the central portion of the scanning direction.

According to an aspect of the present invention, there is provided an ink jet printing method for printing an image on a print medium by causing a print head, on which a plurality of ejection ports that eject ink are aligned, to scan the print medium a plurality of times, wherein: the number of locations at which ink drops are ejected such that their landing locations overlap on a first area, at which among a plurality of printing operations accompanying the plurality of scans for printing the image, 1 or more printing operations are carried out that accompany a scan using ejection ports contained at the ends of the print head, on the print medium is larger than the number of locations at which ink drops are ejected such that their landing locations overlap on a second area, at which among a plurality of printing operations accompanying the plurality of scans for printing the image, all of the printing operations do not use ejection ports contained at the end of the print head, on the print medium.

According to an aspect of the present invention, there is provided an ink jet printing method for printing an image on a print medium by causing a print head, on which a plurality of ejection ports that eject ink are aligned, to scan the print medium a plurality of times, wherein: the rate of pixels at which ink drops are ejected such that their landing locations overlap on a first area, at which among a plurality of printing operations accompanying the plurality of scans for printing the image, 1 or more printing operations are carried out that accompany a scan using ejection ports contained at the ends of the print head, on the print medium is larger than the rate of pixels at which ink drops are ejected such that their landing locations overlap on a second area, at which among a plurality of printing operations accompanying the plurality of scans for printing the image, all of the printing operations do not use ejection ports contained at the end of the print head of the print medium.

According to an aspect of the present invention, there is provided an ink jet printing method for printing an image at a unit area on a print medium, by causing a print head, on which a plurality of ejection ports that eject ink are aligned, to scan the unit area 2 times in a scan direction that crosses the direction of the ejection port array, comprising: a generation step that generates first print data and second print data for printing at each of the scans, based on image data to be printed at the unit area and based on a first mask pattern and a second mask pattern that correspond to the 2 scans; a printing step that performs printing at the unit area by the 2 scans of the print head, based on print data generated at the generation step; wherein print permitted pixels of the first mask pattern and the second mask pattern are established such that, in both of the first and second mask patterns, the duty of the pixels that are permitted to carry out printing at the area corresponding to the central portion of the print head is higher than the duty of the pixels that are permitted to carry out printing at the area corresponding to the ends of the print head; and wherein, in an image pattern corresponding to data that can be obtained by performing a logical AND operation between the first print data and the second print data, more pixels are contained at the central portion of the scanning direction than pixels that are contained at the ends of the scanning direction.

According to an aspect of the present invention, there is provided an ink jet printing method for printing an image at a unit area on a print medium, by causing a print head, on which a plurality of ejection ports that eject ink are aligned, to scan the unit area 1 time, comprising: a first ejection port array, and a second ejection port array that ejects ink of the same color as the first ejection port array, being aligned along the scanning direction of the print head; and the number of locations at which ink drops are ejected such that their landing locations overlap on a first area, at which an image is printed using an ejection port group that contains ejection ports at ends of the first and second ejection port arrays, on the print medium is larger than the number of locations at which ink drops are ejected such that their landing locations overlap on a second area, at which an image is printed without using the ejection port group that contains ejection ports at the ends of the first and second ejection port arrays of the print medium.

According to an aspect of the present invention, there is provided an ink jet printing method for printing an image at a unit area on a print medium, by causing a print head, on which a plurality of ejection ports that eject ink are aligned, to scan the unit area 1 time, comprising: a first ejection port array, and a second ejection port array that ejects ink of the same color as the first ejection port array, being aligned along the scanning direction of the print head; a generation step that generates print data for printing an image at the unit area using the first ejection port array and that generates print data for printing an image at the unit area using the second ejection port array; wherein the unit area comprises a first area, at which an image is printed using an ejection port group that contains ejection ports at ends of the first and second ejection port arrays, and a second area, at which an image is printed without using the ejection port group that contains ejection ports at ends of the first and second ejection port arrays, the generation step generates print data for printing at the first area based on image data corresponding to the image to be printed at the first area and based on first and second mask patterns, and the generation step generates print data for printing at the second area based on image data corresponding to the image to be printed at the second area and based on third and fourth mask patterns; a printing step that prints an image at the unit area based on the print data generated at the generation step; wherein the number of pixels, among a plurality of pixels included in a print image corresponding to print data for printing at the first area, that are permitted to be printed by the first and second mask patterns, is larger than the number of pixels, among the plurality of pixels included in a print image corresponding to print data for printing at the second area, that are permitted to be printed by the third and fourth mask patterns.

According to an aspect of the present invention, there is provided an ink jet printing apparatus that prints an image at a first area on a print medium and an image at second area on the print medium having the same size as the first area, by causing a print head, on which a plurality of ejection ports that eject ink are aligned, to scan a plurality of times each with respect the first area and the second area, comprising: a first generation unit that generates print data for each of the plurality of scans of the print head at the first area, based on image data corresponding to the image to be printed at the first area, at which printing is performed, at least 1 scan among the plurality of scans of the print head, using an ejection port group that includes ejection ports at ends of an array of the plurality of ejection ports of the print head, and based on a first mask pattern group that contains a plurality of mask patterns;

a second generation unit that generates print data for each of the plurality of scans of the print head at the second area, based on image data corresponding to the image to be printed at the second area, at which printing is performed, at all scans among the plurality of scans of the print head, using an ejection port group that does not include the ejection ports at the ends of the array of the plurality of ejection ports of the print head, and based on a second mask pattern group that contains a plurality of mask patterns; a first printing unit that performs printing at the first area by a plurality of scans, based on the print data generated by the first generation unit; a second printing unit that performs printing at the second area by a plurality of scans, based on the print data generated by the second generation unit; wherein the number of pixels, among a plurality of pixels included in a print image corresponding to the print data generated by the first generation unit, that are permitted to be printed by at least 2 mask patterns in a process using the first mask pattern group, is larger than the number of pixels, among the plurality of pixels included in a print image corresponding to the print data generated by the second generation unit, that are permitted to be printed by at least 2 mask patterns in a process using the second mask pattern group.

According to this invention, because it is possible, through ejection control, to suppress density imbalance caused by the difference in temperature rise among each of the ejection ports on the print head, it is possible to provide an ink jet printing apparatus and printing method that can simply maintain high density quality in printed images, without the addition of additional structure.

Further features of the present invention will become apparent from the following description of exemplary embodiments (with reference to the attached drawings).

BRIEF DESCRIPTION OF THE DRAWINGS

FIG. 8A corresponds to ejection ports 1 to 128 of FIG. 4, FIG. 8B corresponds to ejection ports 129 to 256, and FIG. 8C illustrates the graph obtained when the print-permission ratios of the masks shown in FIGS. 8A and 8B are combined;

FIG. 9A is a graph of ejection ports 1 to 128 of FIG. 4, and FIG. 9B is a graph of ejection ports 129 to 256;

FIG. 10A is a graph of ejection ports 1 to 128 of FIG. 4, and FIG. 10B is a graph of ejection ports 129 to 256;

FIG. 12A is the 2 pl dot pattern, FIG. 12B is the 5 pl dot pattern, and FIG. 12C is a dot pattern of the combined 2 pl and 5 pl dots;

FIGS. 15A and 15B are diagrams that show dot arrangement in a case of comparing different colors of ink where, in the second embodiment, at the ejection ports that eject 5 pl ink, double impacts are carried out at 2% of the pixels;

FIGS. 17A to 17C are diagrams for explaining the mask patterns used in the third embodiment;

FIG. 18B is a graph with the vertical axis representing dot diameter of ink drops ejected from ejection ports and the horizontal axis representing the ejection port position of those ejection ports, when printing is performed by the printing method of the third embodiment;

FIG. 19A is a figure that shows the image obtained when printing is performed using mask patterns of the third embodiment on which double impacts are not carried out, and the lightness distribution corresponding to that image;

20A is a graph of ejection ports 1 to 128 of FIG. 16, FIG. 20B is a graph of ejection ports 129 to 256, and FIG. 20C is a graph of the result of overlaying the masks at the time when the print area is printed;

FIG. 23A is a graph of ink ejection from ejection port array A, FIG. 23B is a graph of ink ejection from ejection port array H, and FIG. 23C is a graph of the result of overlaying the masks at the time when the print area is printed;

FIG. 28A is a graph of ejection ports 1 to 16 of FIG. 24, FIG. 28B is a graph of ejection ports 241 to 256, and FIG. 28C is a graph of the result of overlaying the masks at the time when the print area is printed;

FIG. 33B is a plan view of the print image when, in the sixth embodiment of the invention, a printing in which double impacts are not carried out is performed, and also illustrates a corresponding graph with the vertical axis representing lightness and the horizontal axis representing position on the print medium.

DESCRIPTION OF THE EMBODIMENTS

Preferred embodiments of the invention will be described in detail below while referring to the accompanying drawings.

First Embodiment

Figure 1A:
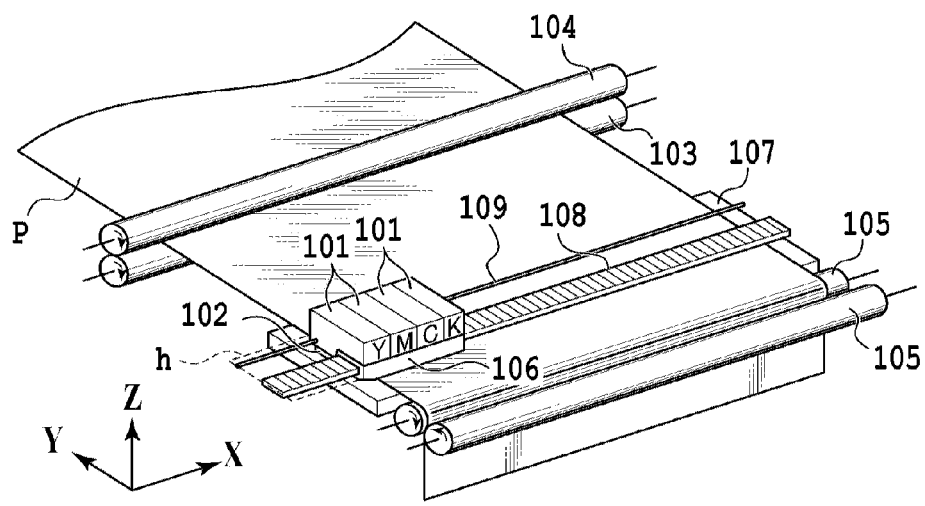
FIG. 1A is a schematically shown perspective view of the ink jet printing apparatus of a first embodiment of the invention.
Figure 1B:
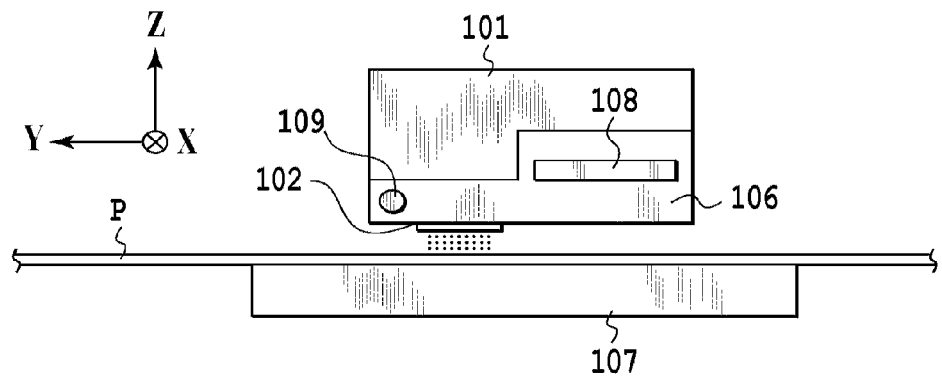
FIG. 1B is a cross sectional view taken along the plane Y-Z of FIG. 1A.

FIGS. 1A and 1B are perspective views that illustrate the skeleton framework of the ink jet printing apparatus of a first embodiment of the invention. FIG. 1A illustrates a perspective view of the printing apparatus and FIG. 1B is a cross-sectional view that passes through the print head along the Y-Z plane of FIG. 1A. In FIGS. 1A and 1B reference numerals 101 denote ink cartridges. In the displayed configuration the ink jet printing apparatus is mounted with 4 ink cartridges. The ink cartridges house cyan (C), magenta (M), yellow (Y) and black (K) ink, respectively. Reference numeral 102 indicates a print head that ejects the above ink, causing it to be impacted onto the facing print medium P. Reference numeral 103 is a conveyance roller, 104 is a supporting roller, and these rollers rotate in the direction of the illustrated arrows while working together to restrain the print medium P, and convey the print medium P in the +Y direction as necessary. Reference numeral 105 denotes a sheet feeding roller that, along with carrying out feeding of the print medium P, performs a role of restraining the print medium P in the same manner as the conveyance roller 103 and the supporting roller 104. Reference numeral 106 indicates a carriage that supports the ink cartridges 101 and moves them upon the performance of printing. The carriage 106 stands by at the home position h, which is at the position shown by the dotted lines of the figure, when printing is not being carried out or when a recovery operation, etc., is being performed. Reference numeral 107 denotes a platen that carries out the role of stably supporting the print medium P at the printing position. Reference numeral 108 denotes a carriage belt that causes the carriage 106 to scan in the X direction, and reference numeral 109 denotes a carriage shaft that supports the carriage 106. The ink jet printing apparatus forms images on a print medium by repeatedly alternating scans of the carriage in the scanning direction, which is the ±X direction, and conveyances of the print medium in the Y direction, which crosses the X direction.

Figure 2A:
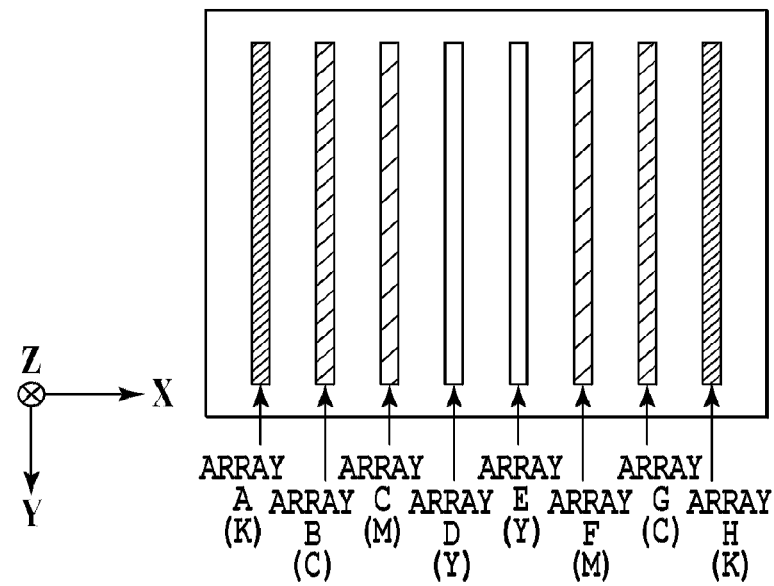
FIG. 2A is a plan view illustrating the surface of the print head used in the ink jet printing apparatus of FIG. 1A, on which ejection ports are formed.
Figure 2B:
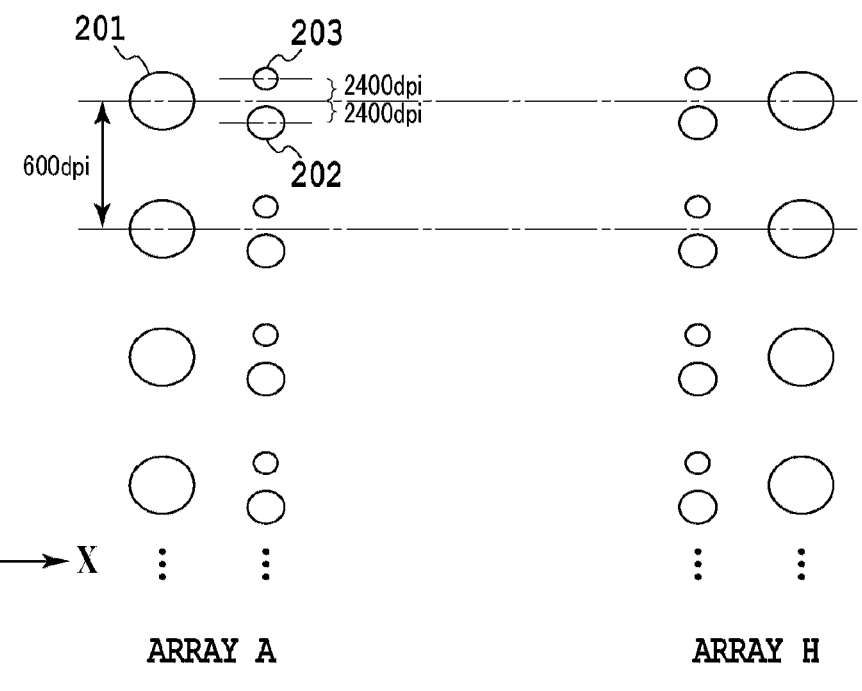
FIG. 2B is an enlarged plan view of ejection ports of the print head.
Figure 4:
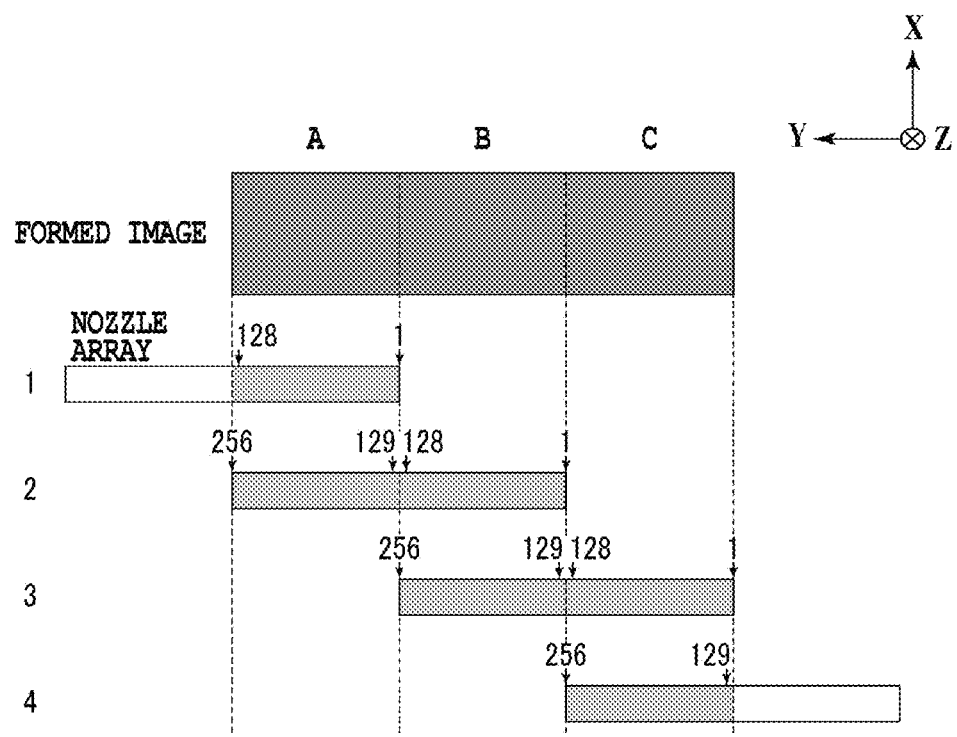
FIG. 4 is a diagram for explaining the positional relationship between the print head and the print image on the print medium, when printing is performed by the ink jet printing apparatus of FIG. 1A.

FIGS. 2A and 2B are drawings that illustrate the structure of the print head 102. FIG. 2A is a bottom-side view when viewing the print head along the Z direction and FIG. 2B is an enlarged view in the vicinity of the ejection ports. In FIG. 2A black ink is ejected from rows A and H, cyan ink from rows B and G, magenta ink from rows C and F, and yellow ink from rows D and E. By symmetrically arranging ink in the scanning direction in this manner, the order that ink is impacted onto the print medium is the same in either of the cases of scanning in the +X direction or the −X direction. Due to this it is possible to suppress the outbreak of color unevenness. FIG. 2B illustrates an enlarged view of row A and row H. Rows B, C, and D have the same ejection port array layout as row A, and rows E, F, and G have the same ejection port array layout as row H. Row A is comprised of 5 pl ejection ports 201 that eject an ink volume of 5 pl, 2 pl ejection ports 202 that eject an ink volume of 2 pl, and 1 pl ejection ports 203 that eject an ink volume of 1 pl. The center of the 5 pl ejection port 201 and the center of the 2 pl ejection port 202 are arranged at a shift of 2400 dpi (dots per inch) in the Y direction. In similar fashion, the center of the 5 pl ejection port 201 and the center of the 1 pl ejection port 203 are arranged at a shift of 2400 dpi in the Y direction. These ejection ports are arranged at a pitch of 600 dpi in the Y direction, which is the alignment direction. Heaters (not shown) are located directly beneath (+Z direction) each of the ejection ports. In the case where these heaters are heated, ink is ejected from the ejection ports by via the ink directly above the heaters bubbling. In FIG. 2B, 4 of each of the ejection ports are shown along the Y direction, which is the alignment direction, however, 256 ejection ports are formed in actuality. The ejection port configuration of row H is a mirror image of row A, and each of the ejection port ejection amounts, ejection port pitches, and number of ejection ports in the array direction is the same as that of row A. It should be noted that, as explained in detail later, a case will be supposed and explained where the mask pattern used at each scan uses 1 ejection port array of each color. In the case of printing using the print head of the current figure, in actuality ink is ejected using both of the 2 arrays A and H, and in this case mask patterns for each scan are further divided into 2 mask patterns, which are used to generate print data for each ejection port array.

Figure 3:
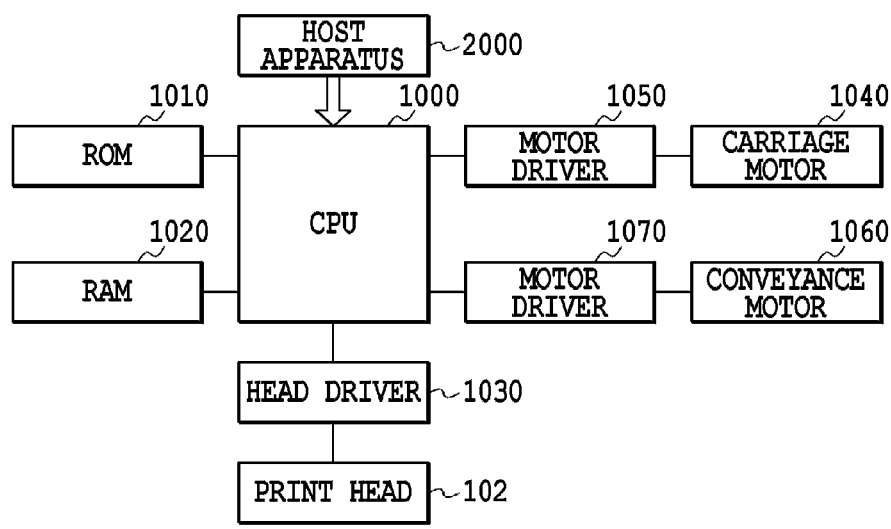
FIG. 3 is a block diagram of the control system of the ink jet printing apparatus of FIG. 1A.

FIG. 3 is a block configuration diagram of the control system of the ink jet printing apparatus of the present embodiment. The CPU 1000 executes a variety of motion control processes, data process, etc., in response to inputs from the host apparatus 2000. Programs for their operating procedures, etc., are stored in the ROM 1010. The RAM 1020 is used as a work area, or the like, for executing these processes. Ejection of ink from the print head 102 is carried out via CPU 1000 supplying drive data (image data) for electro-thermal conversion elements, etc., and drive control signals (heat pulse signals) to the head driver 1030. The CPU 1000 controls the carriage motor 1040, which is for driving the carriage in the main scanning direction, via the motor driver 1050. The CPU 1000 also controls the conveyance motor 1060, which is for conveying print medium, via the motor driver 1070. In the present embodiment the ROM 1010, RAM 1020 and the CPU 1000 serve as printing control means that carry out the control of printing.

The printing method of the present embodiment will be explained next. FIG. 4 is a diagram for explaining the relative positional relationship between the print medium and the print head when forming an image. Explanation will be made herein with respect to ejection port array A, however, the other ejection port arrays B to H also have the same relationship as array A.

First, at the initial scan, printing is carried out by causing the print head to scan in the +X direction. At this time ejection ports 1 to 128 are used. After this scan, the print medium P is conveyed 128 dot-portions in the +Y direction, at a resolution of 600 dpi. In actuality the print medium P is conveyed in the +Y direction for each 1 scan of the print head, but in the present embodiment explanation is made using a figure in which the print head moves in the −Y direction with respect to the print medium. Next, at the second scan, printing is performed, using ejection ports 1 to 256, by causing the print head to scan in the −X direction. After this scan, the print medium P is conveyed 128 dot-portions in the +Y direction, at 600 dpi. At the third scan, printing is performed, using ejection ports 1 to 256, by causing the print head to scan in the +X direction. After this scan, the print medium P is conveyed 128 dot-portions in the +Y direction, at 600 dpi. At the 4th scan, printing is performed, using ejection ports 129 to 256, by causing the print head to scan in the −X direction. After this scan the print medium P is discharged and printing is completed. Areas A, B and C are areas that correspond to a distance wherein the print medium is conveyed 1 time, and are referred to "bands" in this specification. In the present embodiment, because 1 conveyance is 128 ejection port units, the width of 1 band in the X direction is that of 128 nozzles. Using a later described mask process, the printing of an image is completed by way of causing the print head to scan 2 times at each of the respective bands.

Figure 5A:
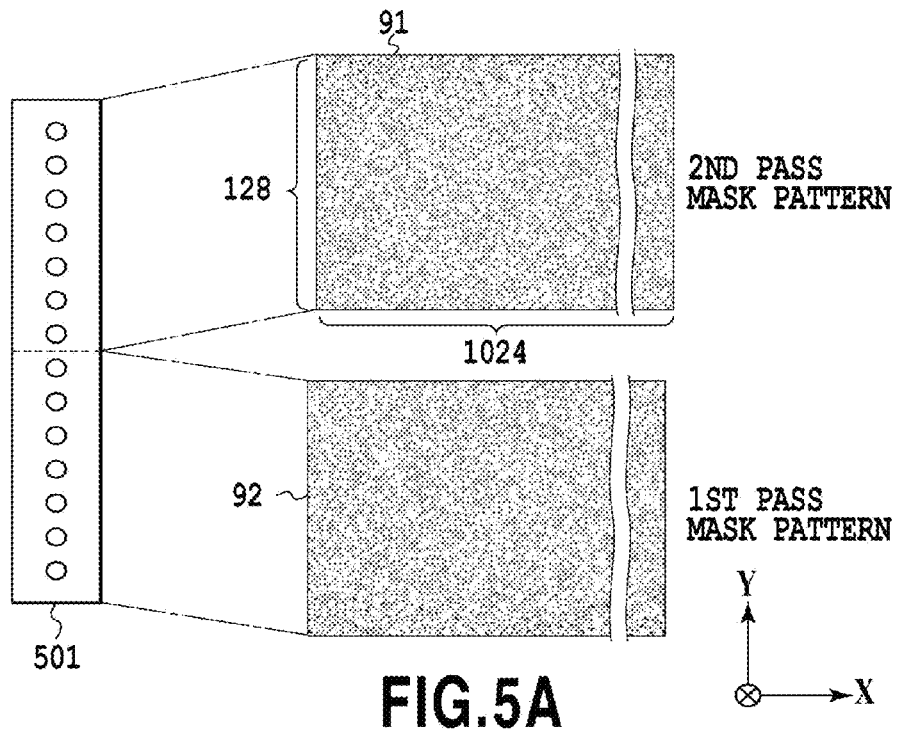
FIGS. 5A and 5B are figures that show masks used when printing the print image of FIG. 4.
Figure 5B:
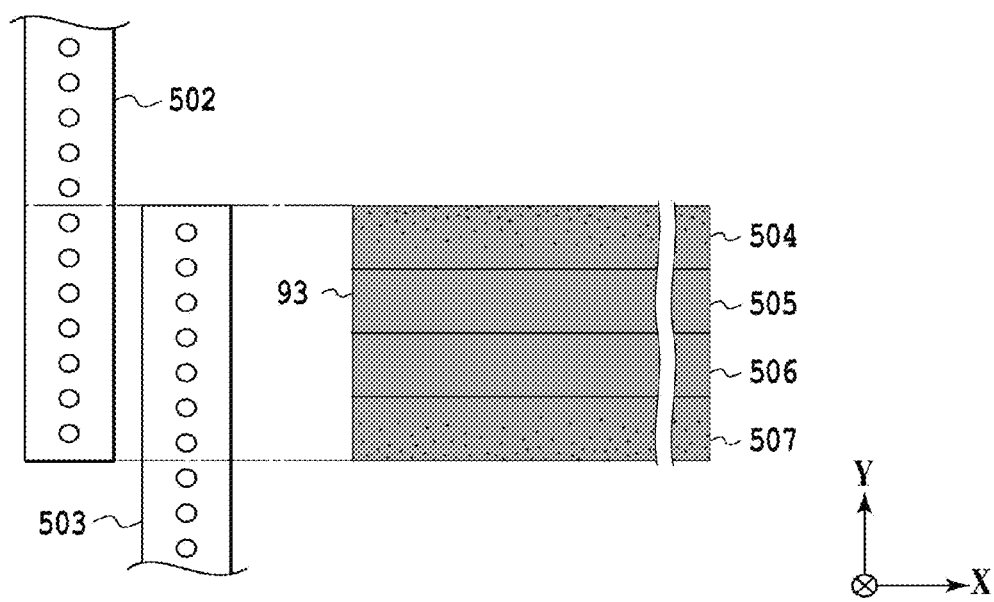

FIGS. 5A and 5B are diagrams that show the correspondence between an ejection port array and a mask pattern group used in the present embodiment. The mask patterns that are included in this mask pattern group are comprised of pixels at which printing is permitted (print permitted pixels) and pixels at which printing is not permitted (non-print permitted pixels). Based on these mask patterns and print data (image data), print data that controls the ejection of ink at each of the scans is generated. More concretely, by respectively performing a logical AND operation between the image data and each pattern, image data is generated such as to permit the ejection of ink at pixels that correspond to the print permitted pixels of the mask pattern. In the present embodiment explanation will be made while using a 1 band (a width of 128 nozzles) portion of print data and mask pattern. FIG. 5A, in the case of performing 2-pass printing, illustrates an ejection port array provided with 256 ejection ports, and 2 mask patterns. Mask pattern 91 is used when printing the 1st scan using ejection ports 1 to 128. Mask pattern 92 is used when printing the 2nd scan using ejection ports 129 to 256. FIG. 5B is a pattern that corresponds to the image obtained by performing a logical OR operation among the mask pattern 91 and the mask pattern 92. Thus, using these mask patterns, FIG. 5B is the print image obtained when a solid image has been printed by way of 2 scans, 1 scan of the ejection port array 502 and 1 scan of the ejection port array 503. Herein a "solid image" denotes an image with a 100% printing ratio, in which ink has been ejected once at every pixel.

In FIGS. 5A and 5B both gray pixels and black pixels exist at the mask patterns and the print image. For example, it is shown that, at mask pattern 91, the gray pixels are print permitted pixels of the mask pattern 91, but at mask pattern 92 the pixels that correspond to the same locations (pixels) are not print permitted pixels. It is also shown that, at mask pattern 92, in similar fashion, the gray pixels are print permitted pixels of the mask pattern 92, and at mask pattern 91 the pixels that correspond to the same locations are not print permitted pixels. On the other hand, the black pixels denote pixels that are print permitted pixels on both of the 2 mask patterns 91 and 92. Thus, at FIG. 5B, with respect to the grey pixels, ink is ejected by one printing operation operation out of the printing operation operations accompanying the 2 scans. In contrast, at the black pixels, ink is ejected at both of the 2 printing operations. That is, ink drops are superimposed twice at the black pixels.

In other words, when the gray pixels of the mask patterns 91 and 92, and the black pixels present on both of the masks, are combined, all of the pixels are filled. In general, by using mask patterns that have a total print permitted pixel rate of 100%, ink is ejected once at every pixel among a multiple number of scans, and it is possible to print a solid image with a 100% printing ratio. In respect to this, in the mask pattern group shown at FIG. 5A of the present embodiment, all of the pixels are either grey or black pixels, and the black pixels are those at which ink has been ejected 2 times. For this reason it is possible to print an image with a printing ratio higher than 100%.

One feature of the mask patterns of FIG. 5A of the present embodiment is that more black pixels exist at the end portions of the mask patterns than at their central portions. As for the size of each of the mask patterns, the Y direction is 128 (number of ejection ports); and 1024 in the X direction. In the case where image data is greater than 1024 in the X direction the above described masks may be used repeatedly.

Figure 6A:
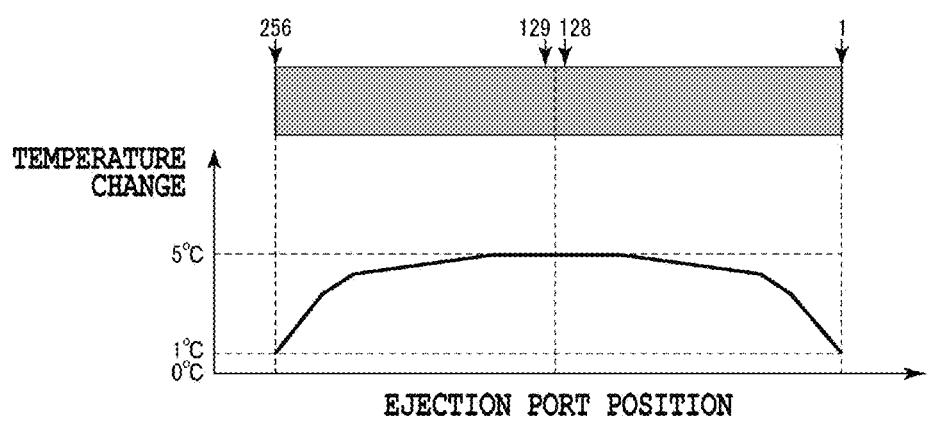
FIG. 6A is a figure that illustrates the relationship between print head temperature variation and ejection port position.
Figure 6B:
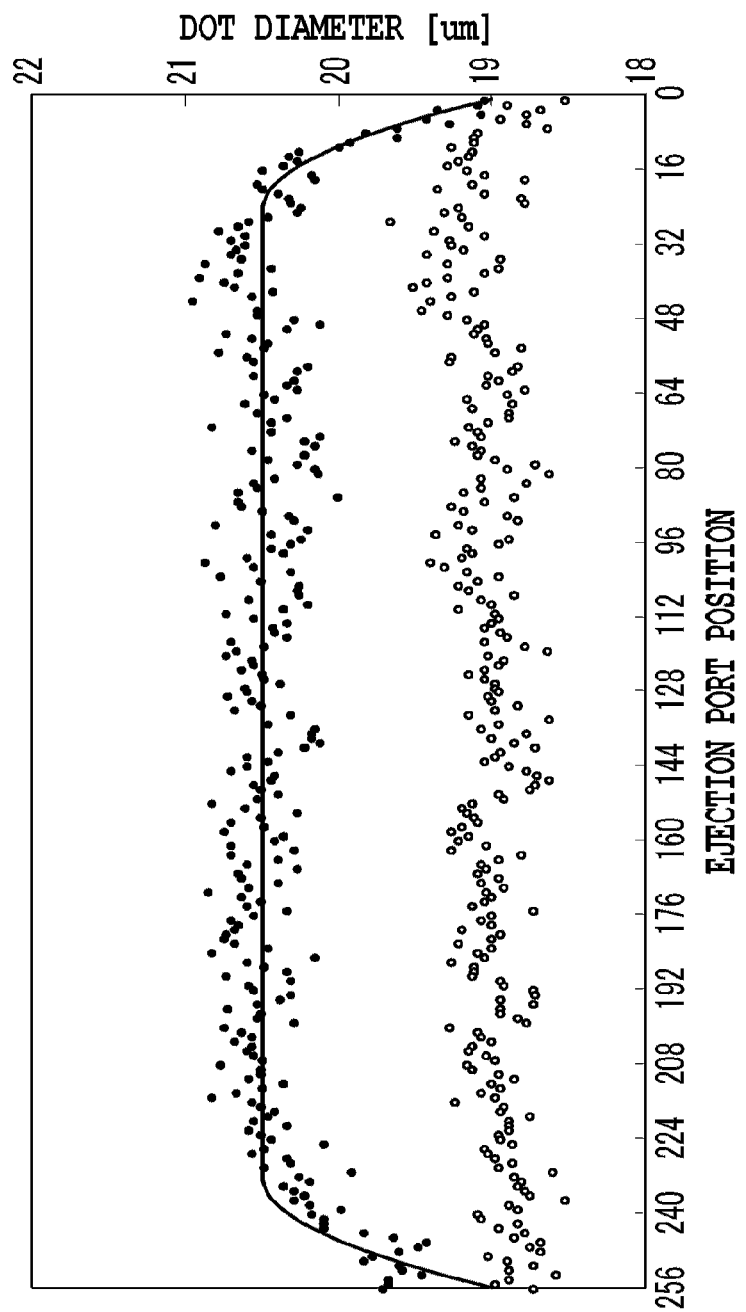
FIG. 6B is a figure that illustrates the relationship between the dot diameters of ink drops ejected from the ejection ports of the print head, and ejection port position.

By using mask pattern groups such as these it is possible to suppress density unevenness in print images that are caused by a temperature difference within the ejection port array. In the case where high duty printing is performed continuously, a temperature difference is generated among each of the ejection ports in the direction that the ejection port arrays are aligned on the print head, and print head temperature is not uniform in the alignment direction of the ejection port array. FIG. 6A illustrates the temperature variation occurring in an ejection port array due to the printing of a solid image with a 100% print ratio. As shown at FIG. 6A, it is recognized that, in contrast to the temperature in the central vicinity of the ejection port array increasing 5° C., the temperature rise in the vicinity of the edges of the ejection port array is 1° C., and that the temperature variation in the vicinity of the edges is smaller than in the central vicinity. This is because heat dissipation at the ends of an ejection port array is favorable in comparison to the central portion of the ejection port array, due to heat being able to dissipate to the exterior of the ejection port array. Accompanying, as described above, the temperature distribution of the print head not being uniform along the direction of alignment of the ejection port arrays, the ink ejection characteristics also become nonuniform. Because of the ink temperature rise accompanying the head temperature rise, the amount of ink ejected increases even though the diameter of an ejection port is the same. FIG. 6B illustrates a graph with the vertical axis representing dot diameter distribution when ink drops ejected from a 1 pl ejection port has impacted on a print medium, and the horizontal axis representing ejection port position along the direction of alignment of an ejection port array. The open circles on the graph are the case where image data with a low duty (a printing ratio on the order of 1%), which is to an extent that head temperature rise does not occur, has been printed. On the other hand, the black dots are the case where high duty image data has been printed. The solid line was fit to the black dot data. In the case of printing a low duty image, sectional temperature increase of the print head is largely not seen, and dot diameter is uniform in the direction of the ejection port array. In contrast, in the case where a high duty image is printed, as shown by the black dots, sectional temperature rise occurs at the central vicinity of the print head, and due to this the amount of ink ejected from the ejection ports varies between the ends and central portion of the ejection port array. Because of this the dot diameter of the ink drops ejected from the print head varies according to the location of the ejection port. In particular, at both ends of the ejection port array, because the effect of the temperature increase is 1° C. there is not much difference from the low duty case, however, because at the central portion of the ejection port array the effect of the temperature increase is 5° C. the ink ejection amount increases, and a result the dot diameter also increases.

Because of this, in the case where high duty printing is performed, in the direction that the ejection ports are aligned, the amount of ink ejected from ejection ports at the central portion of the ejection port array becomes larger than the amount of ink ejected from ejection ports in the end vicinity. That is, an uneven distribution of dot diameters occurs along the direction of the ejection port array. When a solid image is printed using this kind of print head an influence on print image density also occurs. Concretely, because the dot diameter is large at the area printed by ejection ports at the central vicinity of the ejection port array, the intervals between the respective dots becomes small, and they are arranged tightly. On the other hand, because, at the area printed by ejection ports located at the ends of the ejection port array, dot diameter is smaller than dots due to ink drops ejected from ejection ports located at the central portion of the ejection port array, the intervals between the dots is comparatively large. In other words, at the area printed by ejection ports at the central vicinity of the ejection port array, print image density is high, and in the case of black ink, the print image lightness is comparatively low. On the other hand, at the area printed by the ejection ports at the ends, print image density is comparatively low, and in the case of black ink lightness is comparatively high. Density unevenness in print images occurs as a result of the nonuniform distribution of ejection amounts within the ejection port array, as described above.

In contrast to this, the present embodiment establishes, at the areas printed using ejection ports with comparatively small ejection amounts, predetermined pixels at which two ink drops, which are of the same color and ejected from the print head, are impacted. In the present embodiment, pixels where at least two ink drops are planned to be impacted are referred to as "double impact pixels". And, double impacts, which is a process in which at least two ink drops of the same color are impacted at the same pixel, are carried out at the pixels printed by ink drops ejected from the ejection ports having the smallest ejection port diameters and the smallest ejection volumes of 1 pl.

Figure 7A:
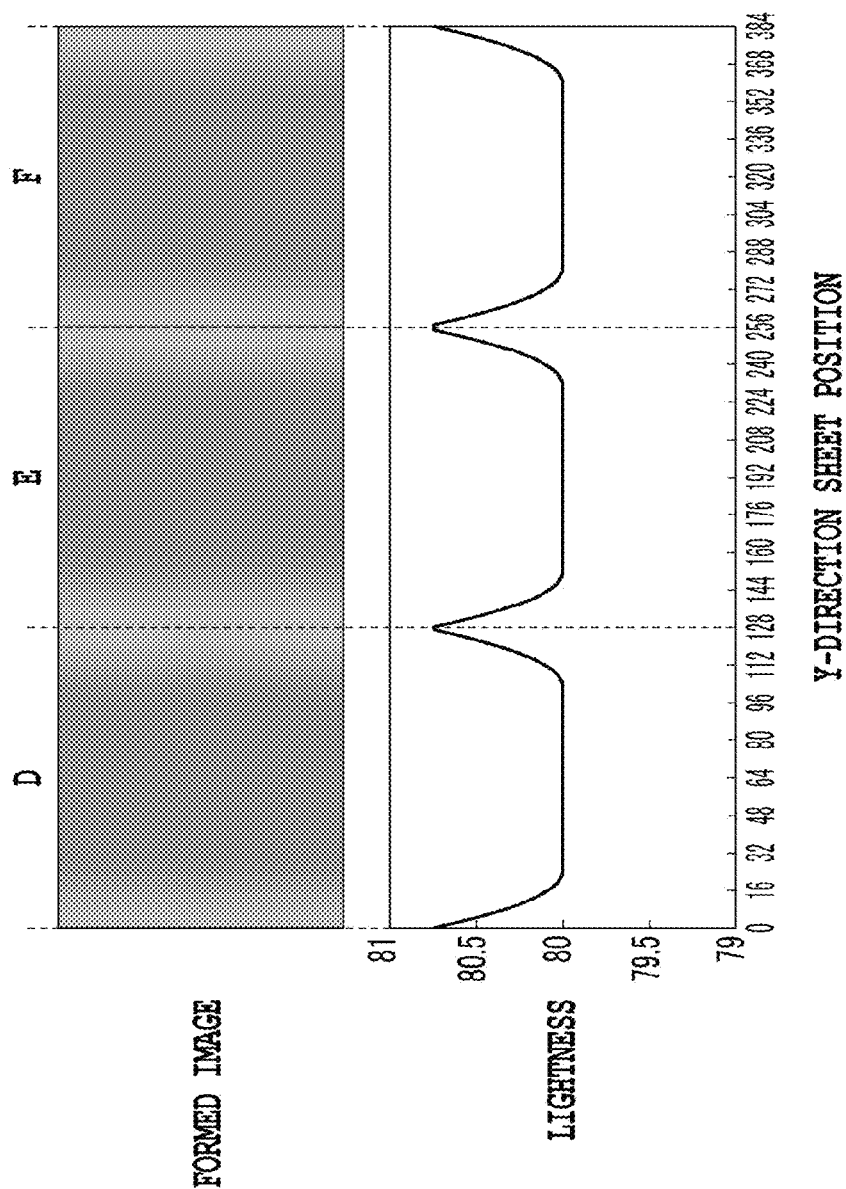
FIG. 7A is a figure that, as an example for comparison, illustrates an image printed using masks in which double impact pixels, which is planned pixels reached at least two ink drops ejected from the print head, are not established, and the lightness distribution of that image.

FIG. 7A illustrates a formed image, and corresponding lightness profile, when a 2-pass printing is performed by a 1 pl ejection port array, using a print head with an uneven ejection amount distribution due to a temperature difference, and without carrying out double impacts. At FIGS. 8A to 8C they can be understood that lightness has comparatively increased at the boundaries of the print regions D, E, and F, which are areas (bands) that correspond to 1 conveyance. This is because the extent to which the white of the undercoat appears has increased, due to the boundary portions of the areas printed by the respective scans having been printed using ejection ports at the end vicinities of an ejection port array with a small dot diameter, and the coverage ratio of the ink dots having decreased.

Figure 8A:
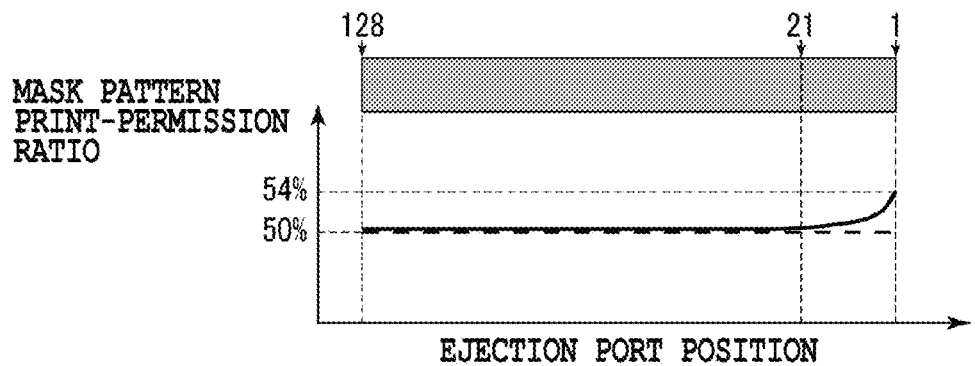
FIGS. 8A to 8C are graphs that illustrate mask pattern print permission ratio.

In contrast to this, the present embodiment establishes pixels at which ink drops are superimposed, at the areas where an image is printed using ejection ports at the end of an ejection port array. In FIG. 8A the vertical axis denotes the print-permitted ratio, which is the rate of print permitted pixels of the mask pattern used with respect to ejection ports 1 to 128 of the print head, and the horizontal axis the direction of the ejection port array. While both are mask patterns used in 2 pass printing, the dotted line is a mask pattern that does not implement double impacts, and the solid line is the mask pattern 91 that does implement double impacts. The mask pattern print-permitted ratio corresponds to the number of ejection ports that carry out ink ejection. Accordingly, on a graph with the horizontal axis representing ejection port position along the direction of alignment, and the vertical axis representing the number of times ink application from an ejection port is performed, the slope of the distribution of the number of times ink application is performed is controlled such that it has a portion that varies. In the case of using a mask pattern that does not carry out double impacts, the rate of ejection ports that eject ink is a uniform 50% from ejection port 1 to ejection port 128. In contrast to this, in the case of using the mask pattern 91 that carries out double impacts, the rate of ejection ports that eject ink becomes the largest at 54%, at ejection port 1 at the end of the ejection port array, and decreases from there as bearing towards the central portion of the direction of alignment of the ejection port array. The rate of ejection ports that eject ink is a uniform 50% from ejection port 21 to ejection port 128.

Figure 8B:
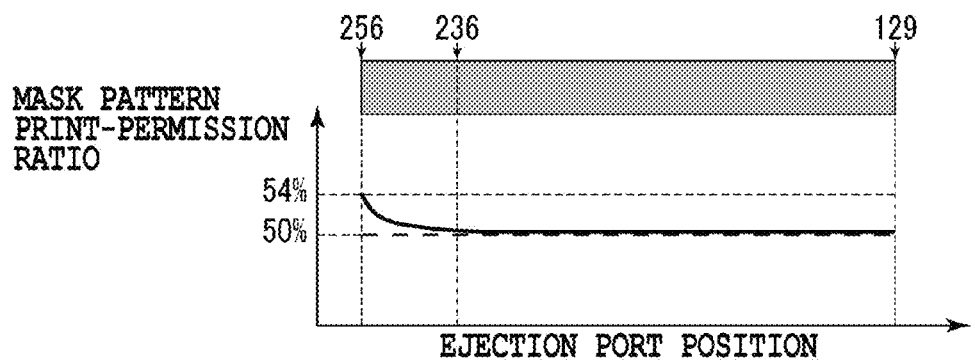

Similarly, FIG. 8B illustrates the print-permitted ratio, along the alignment direction, of the mask pattern used with respect to ejection ports 129 to 256 of the print head. The dotted line is a mask pattern that does not implement double impacts, and the solid line is the mask pattern 92 that does implement double impacts. The mask pattern of FIG. 8B, used with respect to ejection ports 129 to 256, is a mirror image of the mask pattern of FIG. 8A, used with respect to ejection ports 1 to 128.

Figure 8C:
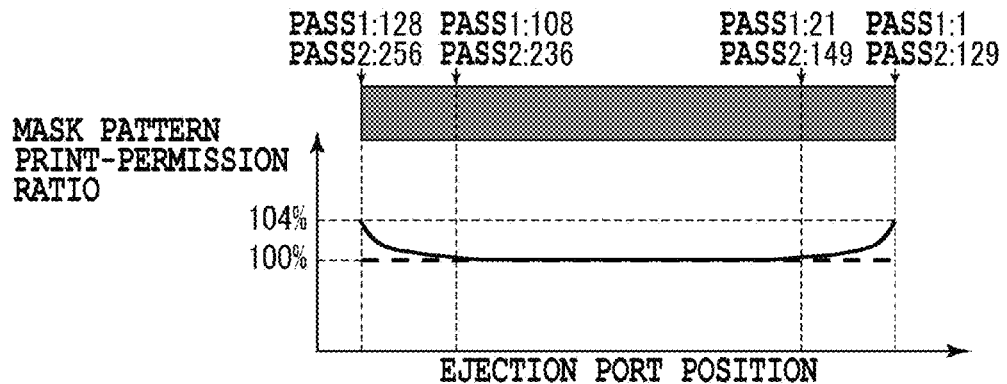

FIG. 8C illustrates combinations of the print-permitted ratios of the 2 mask patterns shown at FIG. 8A, used with respect to ejection ports 1 to 128, and the print permission ratios of the 2 mask patterns shown at FIG. 8B, used with respect to ejection ports 129 to 256. In the FIG. 8C, in similar fashion to FIG. 8A and FIG. 8B, the solid line denotes the total print permission ratio of the mask patterns that carry out double impacts, and the dotted line indicates the total print permission ratio of the mask patterns that do not carry out double impacts. The print permission ratio of the mask patterns that do not carry out double impacts are a uniform 100% overall, along the direction of the ejection port array. On the other hand, the total print permission ratio of the mask pattern 91 and the mask pattern 92 is 100% at the area printed using, at both of the 2 printing operations, only ejection ports of the central portion of the ejection port arrays, and not using the ejection ports at the ends. It is 104% at the area printed using, at one of the 2 printing operations, ejection ports at the end. That is, with respect to the area printed using the mask patterns 91 and 92, at the area at which only the central portion of the alignment direction of the mask patterns is used, an image is printed in which ink drops are ejected one time at all of the pixels, and which is complemented 100%. In contrast to this, at the area where the ejection ports at the end of the alignment direction of the mask pattern are used, on top of ink drops being ejected at least once at all of the pixels, pixels where ink drops are twice superimposed are present at a ratio of 4%.

As described above, the present embodiment uses mask patterns 91 and 92, wherein double impact pixels are present at areas printed using ejection ports of the ends of an ejection port array, along the direction of alignment of the ejection ports, and wherein double impact pixels are not present at areas printed without using the ends of the ejection port array. In this manner, print data for each pass is generated such that double impact pixels are present at areas printed using ejection ports at the end of the ejection port array. Due to this it is possible to suppress the decline of print image quality even where dot diameter of ink drops ejected from ejection ports has become nonuniform, according to position along the direction of alignment, due to the difference in temperature rise within the ejection port array of the print head.

Figure 7B:
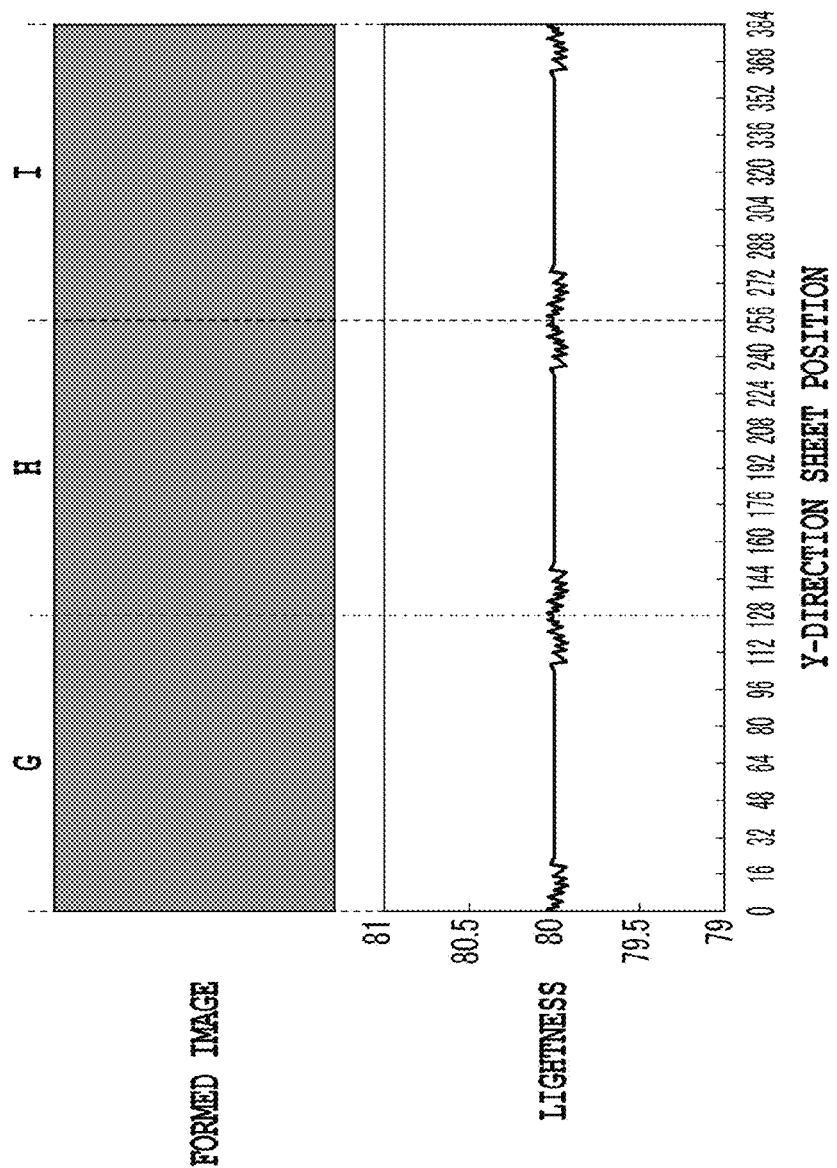
FIG. 7B is a figure that illustrates an image printed using the mask patterns of the first embodiment, in which double impact pixels are established, and the lightness distribution of that image.

An image, and its lightness distribution, printed using mask patterns 91 and 92, are displayed at FIG. 7B. At the image of FIG. 7A, printed using mask patterns in which double impact pixels are not present, lightness has become high at the boundary portions of the image areas D, E, and F, of each of the scans. In contrast, at FIG. 7B it has been possible to suppress lightness variation at the boundaries of the image areas G, H, and I. This is because, at the portion where density has decreased comparatively due to a decrease in the ink ejection amount and a decrease in dot diameter, and where lightness has increased as a result, print image density and lightness have been corrected by the addition of double impact pixels.

When the inventor actually confirmed a print image in which double impact pixels are included, as described above, the difference in lightness at the boundaries between the print regions of the respective scans largely did not stand out. Furthermore, a worsening of graininess, due to the inclusion of the double impact pixels, could also not be perceived. Two reasons can be raised for graininess not standing out. The first reason is that there is not a large difference between the density of the image at which double impact pixels are included and the density of the image at which double impact pixels are not included. This is dependent on the number of double impact pixels and the color of the ink, but, as an example, an image printed by black is considered. Images where ink drops are not impacted are the color of the print medium as it is, that is, that of the white background, and the OD value, which denotes optical density, is on the order of 0.0. The optical density value OD of the image at which 1 ink drop has impacted at each is 1.0, and the optical density value OD of the image at which 2 ink drops have impacted at each is 1.5. In comparison to the OD difference (1.0) between white background and an image at which 1 in drop is impacted at the same location, the OD difference (0.5) between a 1-impact image and a double impact image is comparatively small. Graininess stands out easily in the case where there is locally a comparatively large density difference, but it can be said that it is difficult for graininess to stand out because the difference in OD value is comparatively small between images at which 1 ink drop is impacted at the same location and images at which 2 drops are impacted at the same location. Regarding other ink colors as well, with respect to the difference between white background and an image at which 1 drop is impacted at the same location, and the difference between an image at which 1 drop is impacted at the same location and an image at which 2 drops are impacted at the same location, it is the same in that the latter will be smaller. As for the second reason, there is that, in the present embodiment, ink drops that carry out double impacts are from 1 pl ejection ports, and their diameters are on the order of 20 μm, such as to be sufficiently small. As dot diameter becomes smaller a single particle itself becomes difficult to visually confirm. Conversely, as dot size increases it becomes easier to discern. In the case where a print medium is inspected from a distance of 30 cm, it is difficult to discern dots even with a 40 μm diameter (assuming ink ejection from a 5 pl ejection port). Because of these two reasons it is possible to decrease density unevenness in an image without causing graininess to stand out. As a result, due to mask patterns 91 and 92 used in the present embodiment, it is possible to suppress density unevenness generated at the boundaries of each of the bands even in the case where a dot diameter range occurs because of a temperature rise difference within an ejection port array of the print head.

Furthermore, by carrying out control as per the present embodiment, even if it is supposed that density unevenness has occurred in a print image due to variation in ink ejection amount, it is possible, at a low cost, to suppress quality deterioration in the print image without the addition of a new structure.

It should be noted that, with respect to the area printed without using the end portions of the ejection port array, the present embodiment present invention is not limited to a configuration in which pixels formed by double impacts are not present. At FIG. 5B the area 93, printed via 2 passes by 128 ejection ports, is divided into areas 504 to 507, printed respectively by 32 ejection ports. Area 504 and area 507 are areas that are printed using ejection ports at the end of an ejection port array, at least 1 printing operation. Area 505 and area 506 are areas that are printed without using ejection ports at the ends of the ejection port array, at all of the printing operations. At FIG. 5B, area 505 and area 506 do not contain double impact pixels, but it may also be a configuration wherein double impact pixels are included. In this case, it is necessary that the number of double impact pixels contained by area 505 and area 506 is smaller than the number of double impact pixels contained by area 504 and area 507. This is because, as described above, area 504 and area 507 require more double impact pixels than area 505 and area 506, because they are areas that have a high probability of being printed by ink drops that have a small ejection volume. It should be noted that, in the present embodiment specification, "double impact pixels" are not necessarily limited to configurations in which 2 ink drops are impacted; it goes without saying that they may also be impacted 3 times, or more than 3 times.

In the case of printing low duty data such that head temperature increase is small and a temperature range within the ejection port array is not seen, for the most part a dot diameter range does not occur. With respect to these low duty images there is a fear that double impact pixels will stand out. In the present embodiment, however, data is not added to the print data; it is only that mask patterns are established such that the same corresponding locations on at least 2 or more mask patterns become print-permitted pixels. Thus, in the case of printing a low duty image, the effect on the printed image is small because, there are also few locations where there is agreement between print-permitted pixels on the plurality of mask patterns and the pixels within the image data.

In the mask pattern shown at FIG. 5A, double impact black pixels are arranged at locations corresponding to both ends of the ejection port array of the print head. As described above, by increasing the number of ink drops at the area printed using ejection ports at the ends, in the direction of alignment, of the ejection port array, density unevenness, occurring in a printed image due to a temperature rise range, is suppressed. In this invention, density unevenness in a printed image may be suppressed by causing double impact pixels to exist at areas printed using ejection ports at the ends, in the direction of alignment, of an ejection port array. That is, the total print-permission ratio when superimposing mask patterns according to their correspondence during use may be a configuration such as that of the graph of FIG. 8C. In the mask patterns, the method of arranging black pixels for carrying out double impacts is not limited to the above described mask patterns. In other words, the areas of the mask pattern with a raised print-permission ratio are not limited to areas corresponding to ejection ports at the ends of the ejection port arrays of the print head. Other examples of masks wherein the print-permission ratio distributions of the mask patterns along the direction of alignment of the ejection ports is configured such as that of the graph of FIG. 8C, will be explained next making use of FIGS. 9A, 9B, 10A and 10B.

Figure 9A:
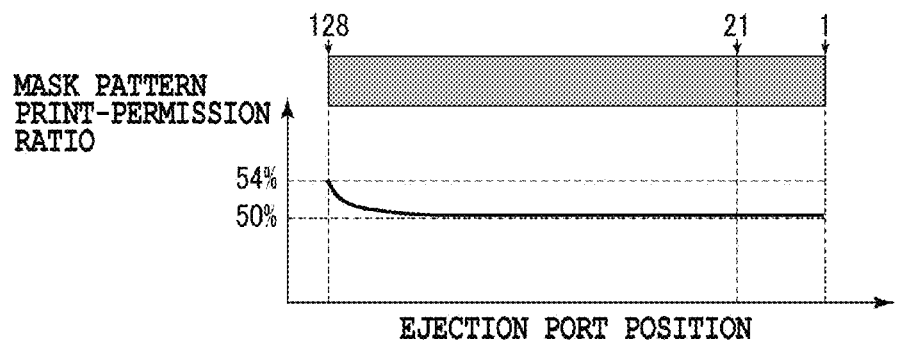
FIGS. 9A and 9B are graphs with the vertical axis representing mask pattern print permission ratio and the horizontal axis representing ejection port position, when printing is performed by the printing method of another implementation of the first embodiment.
Figure 9B:
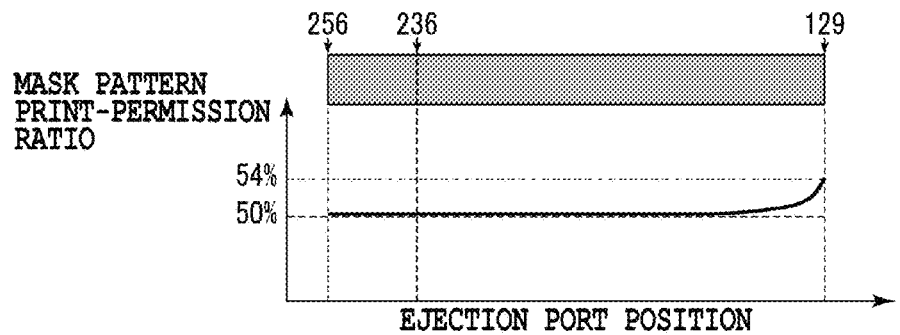

In this present embodiment embodiment, a 2-pass printing is carried out. The rate of print-permitted pixels, which permit the ejection of ink, is raised at areas at which density has comparatively decreased due to ejection ports at the end being used at least one scan of 2 scans. Accordingly, the ejection of ink may be carried out such that, effectively, more double impact pixels are formed at those areas. FIGS. 9A and 9B are an example of arranging double impact pixels at the central portion of an ejection port array of the mask pattern of a 1st pass and at the central portion of an ejection port array of the mask pattern of a 2nd pass.

In a case where the masks shown in FIGS. 9A and 9B are used, among pixels formed by ink ejected from the print head, the proportion of pixels twice impacted and printed by ink from ejection ports at the central vicinity of the direction in which the ejection ports are aligned is increased. Accordingly, in the case where ink drops ejected from ejection ports located at an end of the direction of alignment of the ejection ports, are feared to give rise to an end deviation shifted towards an end portion of the ejection port array, it is possible to increase the ejection of ink at the central portion such that it is greater than at the ends of the alignment direction of the ejection port arrays. Thus it is possible to suppress print image deterioration due to end deviation, which is advantageous in high quality printing. In this manner, the mask patterns may be established such that the number of double impact pixels, using ejection ports located near the central portion of the direction of the ejection port array of a print head, are more than the number of double impact pixels, using ejection ports located far from the central portion.

Figure 10A:
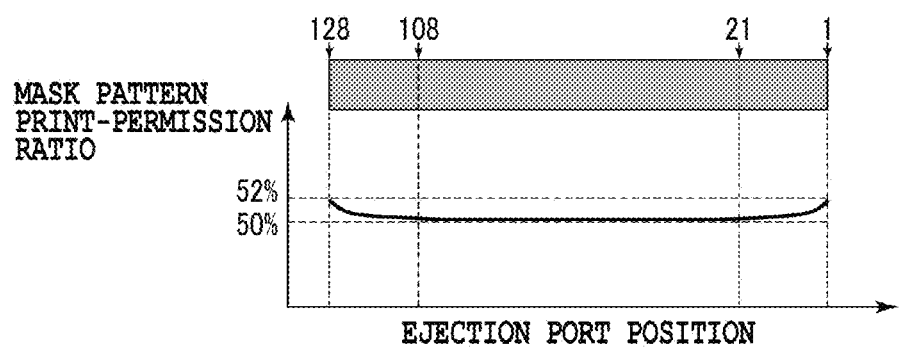
FIGS. 10A and 10B are graphs with the vertical axis representing mask pattern print permission ratio and the horizontal axis representing ejection port position, when printing is performed by the printing method of yet another implementation of the first embodiment.
Figure 10B:
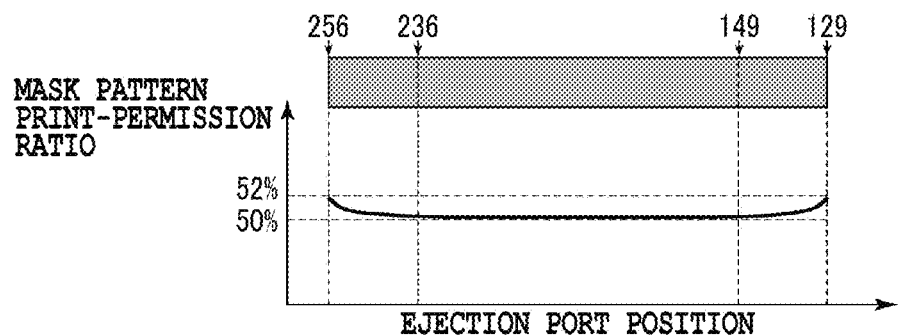

As a method in which double impacts are carried out, another embodiment will now be explained using FIGS. 10A and 10B. In FIGS. 10A and 10B the double impact pixels are made equal at the first and second pass. As shown in FIGS. 10A and 10B, in order to carry out double impacts at the areas printed using the ends of the direction of the ejection port array, the areas causing the mask pattern print permission ratio to be raised are distributed equally among 2 scans. Thus, also in the case where there is a difference in dot diameter between the first pass and the second pass, because images are formed at the same rate at both passes, it is difficult for density unevenness to occur at the boundary portions of adjacent bands. As described above, printing control may be carried out such that there are approximately the same number of ejection ports that form the double impact pixels at the ejection ports at the end of the direction of the ejection port array of the print head as there are at the ejection ports at the central portion of the direction of the ejection port array of the print head.

It is preferable that the pixels at which 2 ink drops are impacted at same locations are arranged such as to be dispersed, to the extent possible, in respect to the main scanning direction of the print head, rather than being arranged at random. This is because when double impact pixels concentrate locally, as the result of random distribution, graininess deteriorates at that location.

It is preferable that the arrangement, on the mask patterns, of pixels that project 2 ink drops, that there not be the same alignment among different ejection port arrays, such as between a 1 pl ejection port array and a 2 pl ejection port array, and between a black ink array and a cyan ink array. Again, it is preferable that the pixels that project 2 or more ink drops at the same location be formed at different locations on each of the ejection port arrays that eject ink of differing amounts. When 2 or more ink drops are projected at the same pixel, from each of a plurality of ejection port arrays of differing ejection amounts, the density at that location increases, and becomes easily visible. In the case of carrying out printing using multiple ejection port arrays, mask patterns are setup in which locations of the double impact pixels differ with respect to each other, or in which the locations where the mask patterns are made to correspond are shifted between ejection port arrays. As described above, it is preferable to create a scheme to lower the double impact rate at the same location. It is preferable that printing control is carried out such as to vary position along the ejection port array alignment direction of the print region, for each of the ejection port arrays. Again, printing control may be carried out such that ejection ports of each ejection amount form double impact pixels, and such that the occurrence rate of pixels that that are formed by double impacts differs for the ink drops of the differing ejection amounts. Again, printing control may be carried out such as to form pixels that carry out double impacts, by respective ejection port arrays that eject ink of differing ejection amounts, and such that the rate at which pixels that carry out double impacts occur varies among the ink drops ejected from the ejection port arrays of differing ejection amounts.

When the print head has multiple ejection port arrays that eject ink of differing colors, the printing apparatus forms pixels at which the number of ink impacts at the same location is increased, at different positions at each of the ejection port arrays ejecting ink with a different colors. As described above, it is preferable to carry out printing control such that the location of the pixels, at which the number of ink impacts at the same location is increased, differs between ink drops ejected from ejection port arrays of differing colors. Printing control may be carried out such as to form double impact pixels, with respective arrays that eject ink of differing color, and such that the position on the mask, along the ejection port array alignment direction, differs for each of the ejection port array. Furthermore, it is preferable to carry out printing control such as to form pixels that are formed by double impacts via respective arrays that eject ink of differing colors, and such that the rate at which the pixels that are formed by double impacts differs for each of the multiple ejection port arrays. Again, in a case where the print head forms pixels with multiple ink impacts at the same location by respective ejection port arrays that eject ink of differing colors, it is preferable that printing be carried out such that the position on the print region, along the ejection port array direction of alignment, varies for each of the ejection port array. As described above, printing control is carried out such that pixels having multiple ink impacts at the same location are dispersed within the print region.

Although in the specification the concept of making the number of ink impacts at the same location greater at certain pixels than at other pixels is expressed by double impacts, the invention is not limited to overlapping 2 dots. In this specification double impacts signifies pixels where the number of ink impacts is greater than at other regions that are arranged ordinarily.

In the case, for example, where printing is carried out with a large number, such as 5, of printing passes, the print duty per 1 pass is decreased in comparison to a printing with a low number of passes, such as 3 pass printing. When the drive frequency of the print head is increased due to increasing the scan speed at this time and increasing the number of dots allocated per unit area, a high print duty is applicable even in the case where the number of printing passes is large. In that case, with respect to a 5 pass printing, taking the number of dots per unit area at the greater part of the region to be a 2 dot distribution, within the 5 passes local printing is carried out with a 3 dot layer or a 4 dot layer, and this may be considered to be double impacts similarly to the present embodiment.

It should be noted that, in the present embodiment, regarding the ejection ports at the ends of the ejection port arrays of the print head, 20 end nozzles were made use of, but the number of nozzles, at which an ejection amount variation due to temperature variation occurs, differs according to the material of the substrate on which the ejection ports are formed, or the flow path for supplying ink, for example. Also, the number of end nozzles also varies according to the position at which the ejection ports furthest to the edges are formed on the substrate, as in ejection port 1 and ejection port 256 of the print head of the present embodiment. Thus, the number to be made end nozzles may be decided according to the range of temperature differences. 3% to 5% of all of the ejection ports of the print head may be decided on as end portion ejection ports.

Second Embodiment

A second embodiment will be explained next. It should be noted that parts that are configured the same as the above described first embodiment have been given the same reference numeral within the figures, the corresponding has been explanation omitted, and that explanation is given only with respect to parts that differ.

The first embodiment did not refer to the ratio at which double impact pixels are included in relation to ink ejection amount and ink color. A reason for this is that, if the ratio at which double impact pixels are included is on the order of 2%, as in the first embodiment, even when viewing the print medium from a distance on the order of 30 cm, dots with a diameter on the order of 40 μm (assuming ink ejection from a 5 pl ejection port) are not discerned easily. However, in the case of viewing from a close distance, graininess is sensed more as dot diameter becomes larger. Also with respect to ink color, in the same manner, the graininess of high density ink becomes high in comparison to low density ink, even in the case where the rate at which double impact pixels are included is the same.

Figure 11:
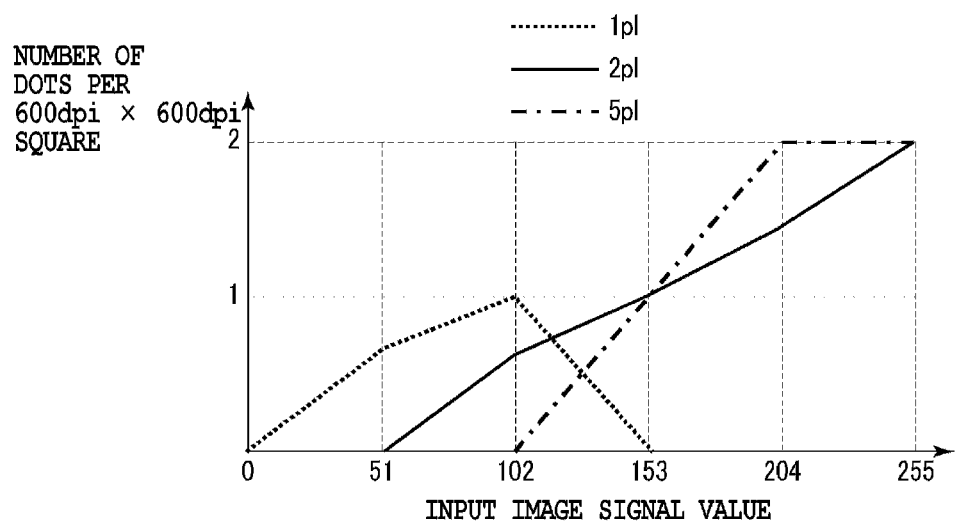
FIG. 11 is a graph that shows the relationship between the input signal value of an input image, and the number of 1 pl ink drops, 2 pl ink drops, and 5 pl ink drops per 600 dpi×600 dpi square area, when printing is performed by the printing method of the second embodiment.

In FIG. 11 the amount of ink consumed per 600 dpi×600 dpi square region is shown with respect to image data input at a resolution of 600 dpi. This ink consumption amount is shown as a comparison of the number of ejected dots, among 1 pl, 2 pl, and 5 pl ink drops. In FIG. 11 the dotted line denotes 1 pl, the solid line denotes 2 pl, and the dash-dotted line denotes 5 pl. As shown in FIG. 11, it can be understood that an image is comprised of dots of multiple dot diameters from the region where the signal value of the input image data is 51. Attention is given here to the location where the input image value is 153. One 2 pl dot and one 5 pl dot are allocated with respect to the data of the input image signal value 153. In the present embodiment, as described above, printing control is carried out such that the printing apparatus varies the number of ink drops of each of the respective ejection amounts, according to the input image signal value. More concretely, printing control is carried out such that the printing apparatus, when ink drops of multiple ejection amounts are ejected from multiple ejection port arrays, varies the ratio of the number of dots caused thereby, in response to the input image signal value.

Figure 12A:
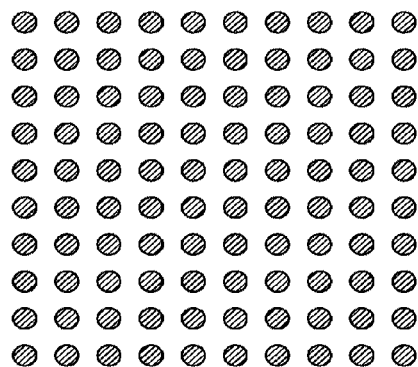
FIGS. 12A to 12C illustrate, when printing is performed by the printing method of a second embodiment of the invention, the dot arrangement when an input signal value of the input image that is 153 has been input.
Figure 12B:
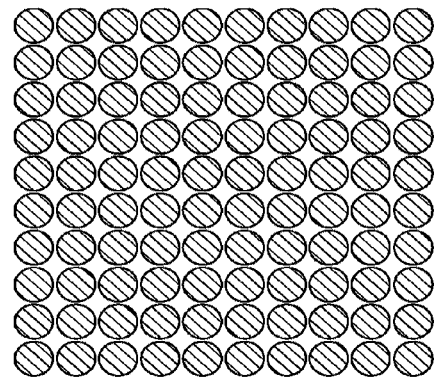
Figure 12C:
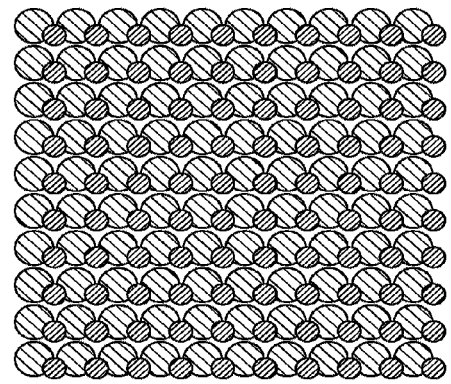

FIGS. 12A to 12C illustrate dot distribution in the case where the signal value 153 is input to a 10×10 pixel region at 600 dpi. This figure is a dot arrangement of an image printed at a region where printing is carried out without using ejection ports at the ends of the ejection port array, in a case where ink is not impacted 2 or more times at all of the pixels. FIG. 12A is a 2 pl dot distribution diagram; FIG. 12B is a 5 pl dot distribution diagram; and FIG. 12C is a dot distribution diagram of the combined 2 pl and 5 pl dots. As shown at FIG. 2B, the 5 pl dots and the 2 pl dots are shifted 2400 dpi in the ejection port array direction, and are shifted 1200 dpi in the direction that crosses the direction of the ejection port array.

Figure 13A:
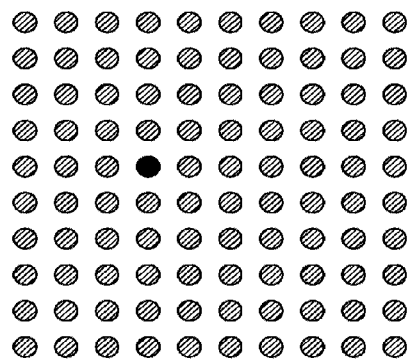
FIGS. 13A to 13C are diagrams that illustrate dot arrangement for the case when, in the second embodiment, the rate of double impact pixels from ejection ports that eject 2 pl ink drops and ejection ports that eject 5 pl ink drops are each 1%.
Figure 13B:
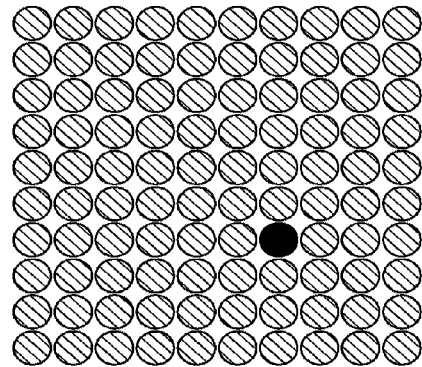
Figure 13C:
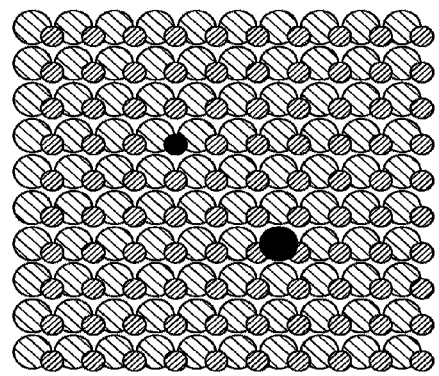

FIGS. 13A to 13C illustrate the dot arrangement of an image at a region printed using a group of ejection ports that include ejection ports at the ends of an ejection port array, in the case where, in the same fashion as FIGS. 12A to 12C, a signal value 153 has been input. Because the printing due to the 2 pl ejection ports and the printing due to the 5 pl ejection ports are both high duty printing, print data is generated such that double impact pixels are included at the area printed using ejection ports at the ejection port array ends. In order to suppress density unevenness in print images double impact pixels at a ratio of 1% for the 2 pl ejection ports and 1% for the 5 pl ejection ports are included in the print data. The black dots of the figure are double impact locations. FIG. 13A is a 2 pl dot distribution diagram; FIG. 13B is a 5 pl dot distribution diagram; and FIG. 13C is a dot distribution diagram of the combined 2 pl and 5 pl dots. It should be noted that, because dots shown in FIGS. 13A to 13C includes dots ejected from end ejection ports, dot diameters of the dots shown in FIGS. 13A to 13C are smaller than the dots shown at FIGS. 12A to 12C, but they are shown here at FIGS. 13A to 13C at the same size for the sake of convenience. As shown at FIGS. 13A to 13C, double impact pixels are included in the print image, and due to this density unevenness in the image, due to a variation in lightness, is suppressed.

Furthermore, although, as mentioned previously, lightness variation is suppressed due to the inclusion of double impact pixels in the print image of FIGS. 13A to 13C, there is a possibility that graininess can stand out because of the existence of the 5 pl double impact locations. In this case, the increase of graininess can be suppressed by making the number of double impact pixels of the 2 pl ink drops greater than the number of double impact pixels of the 5 pl ink drops.

Figure 14A:
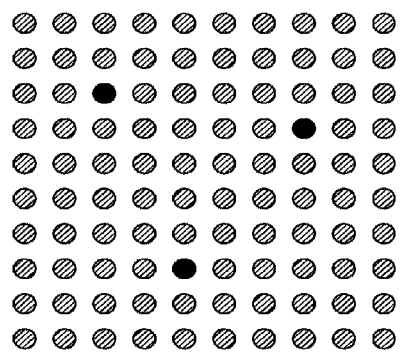
FIGS. 14A to 14C are diagrams that illustrate dot arrangement for the case where the rate of double impact pixels from ejection ports that eject 5 pl ink drops is 0%.
Figure 14B:
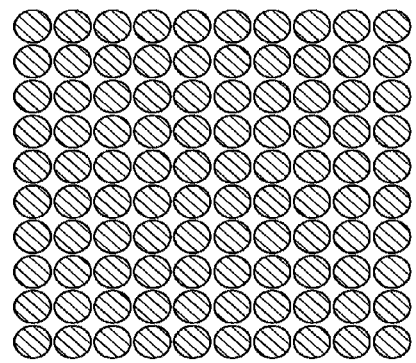
Figure 14C:
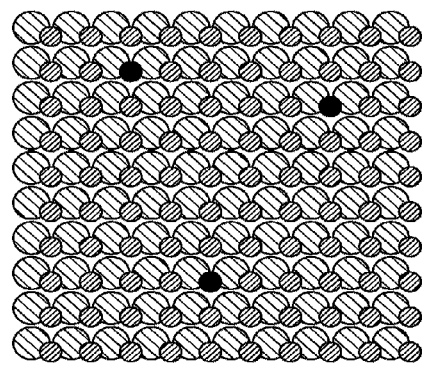

FIGS. 14A to 14C show a dot arrangement at a print region printed using ejection port array ends, wherein the ratio at which double impact pixels are included is 3% for the 2 pl ejection ports and 0% for the 5 pl ejection ports. The black dots of FIGS. 14A to 14C are locations where double impacts are performed. FIG. 14A is a 2 pl ink drop dot distribution diagram; FIG. 14B is a 5 pl ink drop dot distribution diagram; and FIG. 14C is a dot distribution diagram of the combined 2 pl and 5 pl dots. When FIG. 13C and FIG. 14C are compared, although lightness does not vary much when viewed from a macro perspective, at the print image shown at FIGS. 13A to 13C, the pixels impacted 2 times by the 5 pl ink stand out. At the print image shown at FIG. 14C, because there are not locations impacted 2 times by 5 pl ink, and the double impacts are done by 2 pl ink drops, graininess does not stand out. As described above, it is preferable to carry out printing control such that the number of pixels having an increased number of ink impacts at the same location, and which are ejected from ejection port arrays having a larger ejection volume, are decreased to the extent possible.

Next, a case will be considered wherein the rate at which double impact pixels are included, which was 1% for 5 pl ink drops and 1% for 2 pl ink drops, is made 0% for the 5 pl ink drops and 3% for the 2 pl ink drops. For the sake of simplicity 1 pl ink drops are not considered herein. As shown at FIG. 11, 5 pl ink is used in the case where the signal value of image data is higher than 102. At the image where the signal value is from 102 to 153, the number of 2 pl ink drops and 5 pl ink drops increases with the increase of the input image signal value. Thus, with respect to this section, the double impact locations that are caused by 5 pl ink can be replaced as is without a problem by 2 pl ink drops. Next, where the signal value is from 153 to 204, the rise of the 5 pl ink drops surpasses the 2 pl ink drops. In this case, it can be thought that it is good to raise the rate at which double impact pixels are included in the 2 pl ink drops, but, because at this section, sufficiently many 2 pl and 5 pl are disposed in relation to 600 dpi, the white background of the print medium becomes difficult to see. When this state is reached, the ejection amount at the end portion becomes smaller, and because of this the influence of ink drop dot diameter decrease on the print image becomes small. Thus it is not necessary to increase the ratio of locations that are impacted 2 times by 2 pl ink drops. For the same reason nor is there a necessity of raising the ratio of double impact locations at the signal value region from 204 to 255. Lastly, at the signal value region from 51 to 102, because 5 pl is not present at this region, the influence of an increase of 2 pl double impact locations appears, however, as described above at the aforementioned embodiment, in the case of low duty print data, it is difficult for twice impacted locations to stand out. For the above reasons, even where locations impacted 2 times by 5 pl ink drops are replaced by 2 pl ink drops, a decrease in the image quality of the print image does not occur.

As described above, it becomes possible to suppress both graininess and density unevenness by setting the ratio by which double impact pixels are included, using ejection ports having a small ejection amount, higher than the ratio by which double impact pixels are included, using ejection ports having a large ejection amount. To be exact, the possibility that image quality deterioration may occur can not be completely wiped out by replacing, among ejection port arrays, the ejection ports that carry out double impacts. Thus, as a more preferred embodiment, even in the case of using ejection port arrays that have the same ejection amount, mask patterns may be established wherein the rate at which double impact pixels are included varies according to the input image signal value region. More concretely, it is preferable that printing control be carried out such as to vary the ejection amount of ink drops according to the region of the input image signal value, and such that the location of the pixels, at which the number of ink impacts at the same location is increased, varies according to the ejection amount of the ink drops. Printing may also be carried out such as to vary the ratio of the numbers of dots caused by ink drops of multiple ejection amounts, according to the input image signal value region and such that the location of the pixels at which the number of ink drops impacts at the same location is increased varies according to the constituent ratio. As described above, it is preferable that printing be carried out such that the rate at which double impact pixels are included varies according to the input image signal value.

The case of ejection port arrays of differing ink colors is also the same as the case of ejection port arrays of differing ejection amounts. For example, in the case where image data that denotes a gray image is input, not only black ink is used to create gray; each of the colors cyan, magenta, and yellow is combined with black ink. Here, when ink made from a high lightness color material is impacted 2 times, it is easy for graininess to increase. Here, in FIGS. 15A and 15B, at a region printed using the ends of an ejection port array, a dot distribution, comparing different colors of ink, is displayed in the case where, on a 10×10 pixel region, double impacts (comprising 2% of the entire mask) are generated with 5 pl ejection ports. The comparatively dense dots of each figure are double impact locations. FIG. 15A is a distribution diagram for high lightness yellow dots, and FIG. 15B is a distribution diagram for low lightness black dots. In FIGS. 15A to 15B, it would normally be necessary to draw with dots smaller than those of FIGS. 12A to 12C, however, they are drawn here with the same size for the sake of convenience, and as can be seen in the figure, lightness variation is suppressed in the condition where there are double impacts. As shown by FIGS. 15A and 15B, low lightness black ink is more easily perceived as graininess even where the rates at which double impacted pixels are included, and dot-diameters, are the same.

Thus, as described above, the rate at which double impact pixels, using ejection ports ejecting ink made of a color material having a high lightness, is set higher than the rate at which double impact pixels, using ejection ports ejecting ink made of a color material having a low lightness. Because of this it is possible to compensate for lightness while suppressing graininess. As described above, it is preferable to control printing such that the number of pixels wherein low lightness ink is impacted an increased number of times at the same location is as small as possible. In other words, it is preferable that print control be controlled such as to form double impact pixels using respective ejection port arrays that eject ink of differing colors, and that the ratio at which double impact pixels, caused by low lightness ink, are included is small.

Third Embodiment

A third embodiment will be explained next. It should be noted that parts that are configured the same as the above described embodiments have been given the same reference numeral within the figures, the corresponding explanation has been omitted, and that explanation is given only with respect to parts that differ.

The first embodiment carried out printing via 2 scans at each band on the print medium, and used mask patterns that had an approximately 50% overall print permission ratio at each scan. And there, temperature rise becomes non-uniform due to the ejection port position difference along the direction of the ejection port array of the print head, and ink drop double impacts are performed at the area where the density in the printed image has become comparatively low.

In the third embodiment a case will be explained that a mask pattern is used wherein print duty is non-uniform along the ejection port alignment direction on the print head. More concretely, it is a case where a mask pattern is used wherein the print-permission ratio of the area corresponding to the ends of the alignment direction of the ejection port arrays of the print head is low, and the print permission ratio of the area corresponding to the central portion is high. When such a mask pattern is used it is possible to suppress image deterioration due to density variation occurring in a print image due to a print medium conveyance error, and due to a landing error of ink drops ejected from the end of the print head. For example, in Japanese Patent Laid-Open No. 2002-096455, a mask pattern is disclosed where print duty from ejection ports at the ends of the ejection port alignment direction path is lower than the print duty from the ejection ports at the central portion.

In the case of using such a mask pattern there is a possibility that a larger variation in the temperature increase range within the ejection port array of the above described print head will be generated. Because the print duty from the ejection ports at the central portion of the ejection port array, the temperature of which rises easily, is high, and the print duty from the ejection ports at the ends of the ejection port array, the temperature of which rises with difficulty, is low, it is possible for the temperature difference within the ejection port array to become even more larger than the case of using the mask pattern that was used in the first embodiment.

Figure 16:
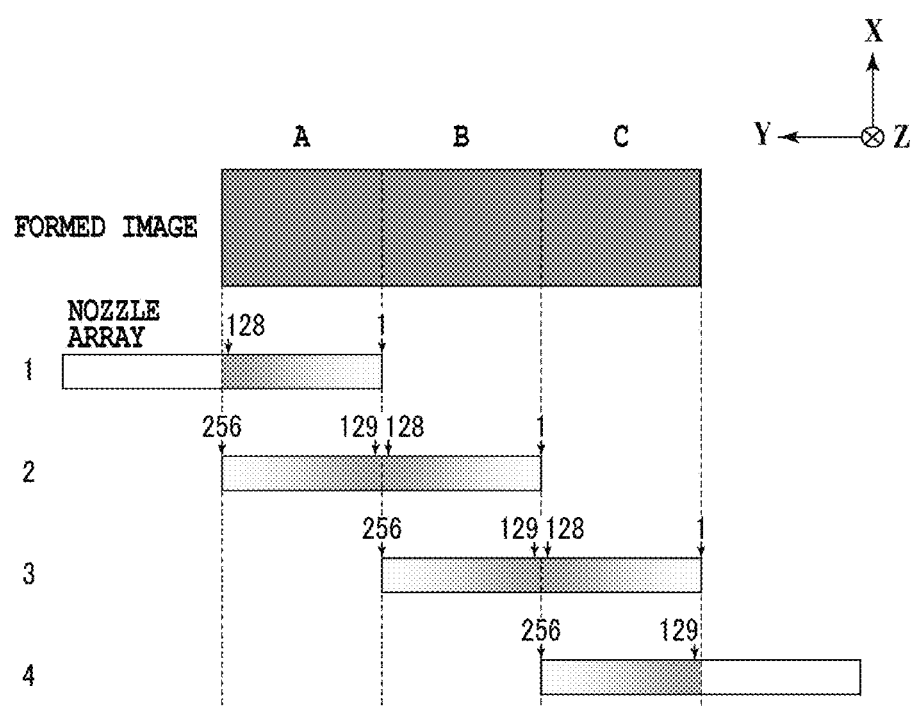
FIG. 16 is a diagram for explaining the positional relationship between the print head and the print medium, in a third embodiment of the invention.

In the present embodiment, similarly to the first embodiment, an image is printed via conveyances of a print medium and 2 scans of the print head with respect to each band on the print medium. FIG. 16 is a diagram that illustrates print duty and the positional relationship between the print medium and print head of the present embodiment. As shown at FIG. 16, print duty is established such that the difference of the print duty along the direction of alignment of the ejection port array is larger than that of the ink ejection print duty of the first embodiment shown at FIG. 4.

The mask pattern used in the printing of the present embodiment will be explained using FIGS. 17A to 17C. The mask patterns used in the present embodiment are set up such that the mask patterns have a relationship in which the mask patterns used at each of the scans on the areas printed by the 2 scans are complemented each other. FIG. 17A is a mask pattern 261 where the 1st pass is printed using ejection ports 1 to 128 and FIG. 17B is a mask pattern 262 where the 2nd pass is printed using ejection ports 129 to 256. FIG. 17C is the result of superimposing mask patterns 261 and 262. In the mask patterns 261 and 262 of FIGS. 17A and 17B as well, black pixels denote double impact pixels by the 2 mask patterns.

Figure 18A:
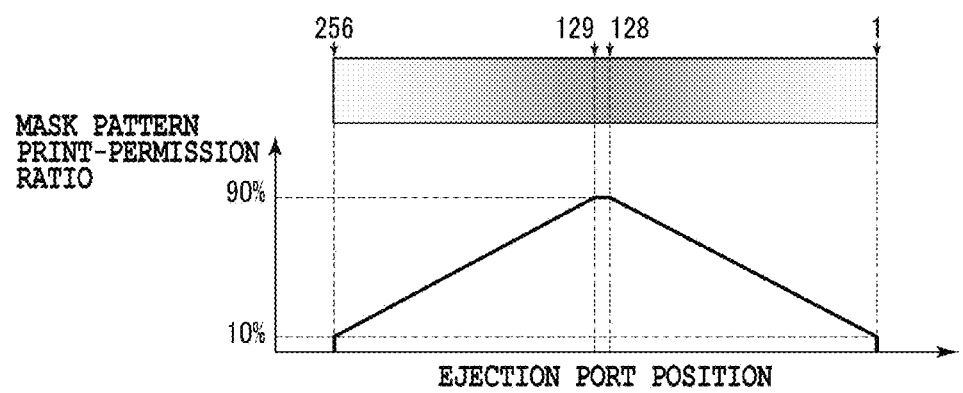
FIG. 18A is a graph with the vertical axis representing mask pattern print permission ratio and the horizontal axis representing ejection port position, when printing is performed using masks of the 3rd embodiment on which double impacts are not carried out.

FIG. 18A is a graph that shows, in the mask pattern used in the present embodiment, print permission ratio along the direction of the ejection port array of the print head. The print permission ratio at both ends (ejection port 1 and ejection port 256), along the alignment direction of an ejection port array, is 10%. From there, the print permission ratio increases as heading from the ends to the central portion, and becomes 90% at the central portion of the ejection port array (ejection ports 128 and 129).

In this manner, using a mask pattern with a low print permission ratio at the ends of the ejection port array, when a printing operation is carried out by 2 scans as shown at FIG. 16, the print duty of the central portion of the ejection port array becomes higher. As a result, the temperature difference between the end portions and the central portion of the ejection port array becomes larger than that of the case where the mask pattern of the first embodiment is used, and the ejection amount difference of the ink drops also becomes larger.

FIG. 18B illustrates the dot diameter distribution when, in the case of printing image data with a 100% printing rate using all ejection ports formed on a print head, ink ejected from 1 pl ejection ports has landed on a sheet surface. When compared with the first embodiment, the temperature increase at the around the ejection ports of the end of the direction of the ejection port array is small, and the temperature increase is large around the ejection ports of the central portion. Thus, the difference between dot diameter of ink drops ejected from ejection ports formed at the ends of the ejection port array and dot diameter of ink drops ejected from the central portion of the ejection port array becomes even larger.

With respect to dot diameter when ink ejected from ejection ports has landed on the print medium, the solid line of FIG. 6B, in the case where the mask patterns of the first embodiment were used, will be compared. At FIG. 6B, the dot diameters of the ink drops at the areas other than the end portions are roughly uniform. In comparison, in the case where the mask pattern of the present embodiment is used, the dot diameters when ejected ink has landed on the print medium have a comparatively large slope even at areas other than the end portions. This is caused by, in addition to the amount of heat dissipation being large at the ejection ports at the ends, the print duty along the direction of alignment of the ejection ports varying greatly. Although description was made herein with respect to the dot diameter of 1 pl ink drops, a dot diameter distribution having the same characteristics is also generated with respect to 2 pl and 5 pl ink drops as well.

FIG. 19A illustrates an image printed using such a mask pattern, without carrying out double impacts, and also shows the lightness distribution corresponding to the printed image. At each of the bands (image areas D, E, F) printed at each scan, lightness at the respective central portions has become high. In comparison to lightness at the boundary regions between the bands becoming high, as in the image printed at the first embodiment, in the image printed by the present embodiment lightness has become high at the central portions of the bands.

At the image printed using the mask pattern of FIG. 18A, the vicinity of each of the boundaries of the bands includes an area formed by end vicinity ejection ports. The dot diameters of the ink drops ejected from ejection port 1 (as well as ejection port 256), at an end of the ejection port array, are the smallest, but the mask pattern print permission ratio corresponding to this ejection port is 10%. On the other hand, the dot diameters of the ink drops ejected from ejection port 129 (as well as ejection port 128), at the central portion, are the largest, and the mask pattern print permission ratio corresponding to this ejection port is 90%. Thus an image is printed having a low lightness around the boundaries of each of the bands, and a high lightness in the vicinity of the central portion.

In contrast, in the mask pattern of the present embodiment, print permitted pixels are arranged such that, at the band regions, which are print regions that correspond to the width of 1 conveyance of the print medium, comparatively more double impact pixels are formed at the central vicinity. FIG. 17C is the printed result in the case where image data with a print ratio of 100% has been printed; the gray pixels printed 1 time by either of the 2 printing operations, and the black pixels printed by both of the 2 printing operations. As for this mask pattern, more black pixels, which denote double impact pixels, exist at the central vicinity than at the ends of the ejection port array alignment direction of each mask.

Figure 20A:
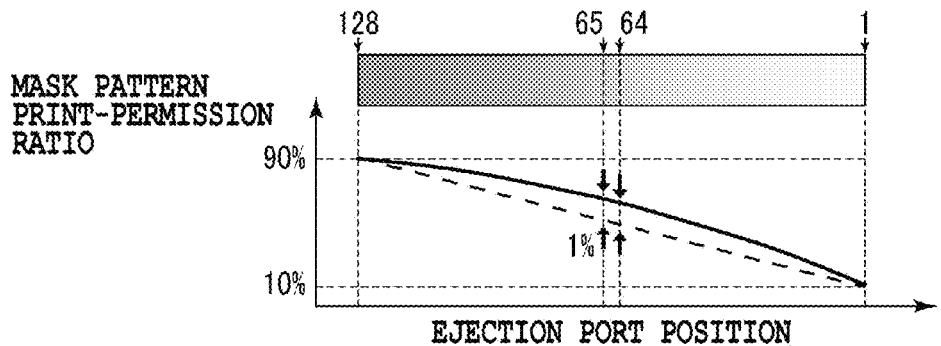
FIGS. 20A to 20C are graphs with the vertical axis representing mask pattern print permission ratio and the horizontal axis representing ejection port position, when printing is performed by the printing method of the 3rd embodiment; FIG.
Figure 20B:
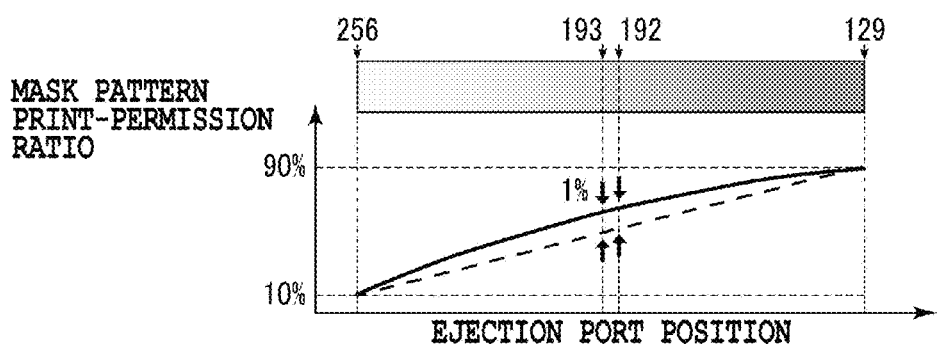

More detailed explanation will be made using FIG. 20. FIG. 20A shows print permission ratio along the alignment direction of the ejection port arrays of the mask pattern 261. The solid line is the permission ratio of the mask pattern 261, the permission ratio of a mask on which double impacts are carried out. The dotted line is a comparative example, a mask pattern at which double impacts are not carried out. As for both of the mask patterns, the print permission ratio increases from 10% to 90% from ejection port 1 to ejection port 128. FIG. 20B similarly illustrates print permission ratios; the solid line being the mask pattern 262 at which double impacts are carried out, and the dotted line being a comparative example, a mask pattern at which double impacts are not performed. The respective mask patterns of FIG. 20B are mirror images of the mask patterns of FIG. 20A.

As for the mask pattern 261, of the case where double impacts are performed, the print ratio increases from 10% to 90%, and quadratically increases much further at the vicinity of ejection port 64 and ejection port 65 (in comparison to the mask pattern in which double impacts are not carried out). Accordingly, at the central portion of the mask pattern that carries out double impacts, the print permission ratio is larger than that of the mask pattern that does not carry out double impacts. This print permission ratio difference is its largest, 1%, when at ejection port 64 and ejection port 65, and decreases as heading toward the ends of the ejection port array, becoming 0% at ejection port 1 and ejection port 16. The same is true with respect to mask pattern 262.

Figure 20C:
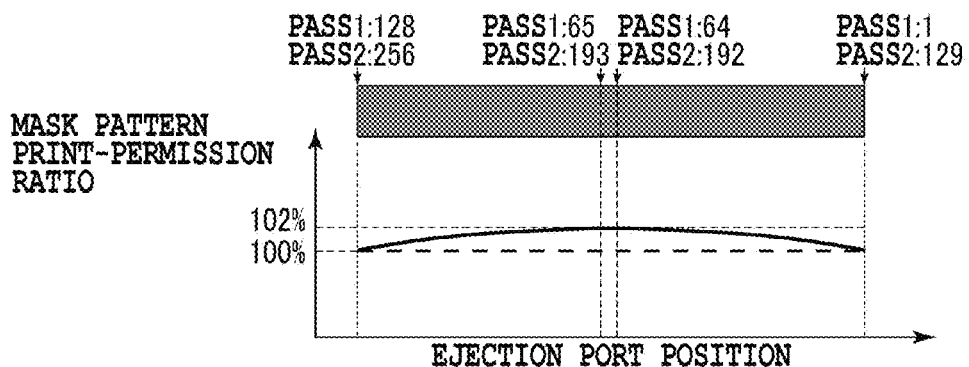

FIG. 20C illustrates the print permission ratio when the respective 2-pass masks have been combined. The print permission ratio, in the case where the mask patterns that do not carry out double impacts have been overlaid, is a uniform 100% along the ejection port array alignment direction. In contrast, the print permission ratio is 102% for the case where the mask patterns 261 and 262 of the present embodiment, at which double impacts are carried out, are overlaid. As a result, in an image printed using mask patterns 261 and 262, at the region where ejection ports at the ends of the ejection port array are used, the 2 mask patterns complement each other, and an image with a print permission ratio of 100% is printed. And at the area where ejection ports of the central portion of the ejection port array are used, the respective pixels printed at the 2 scans complement each other, and in addition to the print permission ratio of the pixels at which ink drops are impacted at least 1 time becoming 100%, double impact pixels also exist at a ratio of 2%.

Figure 19B:
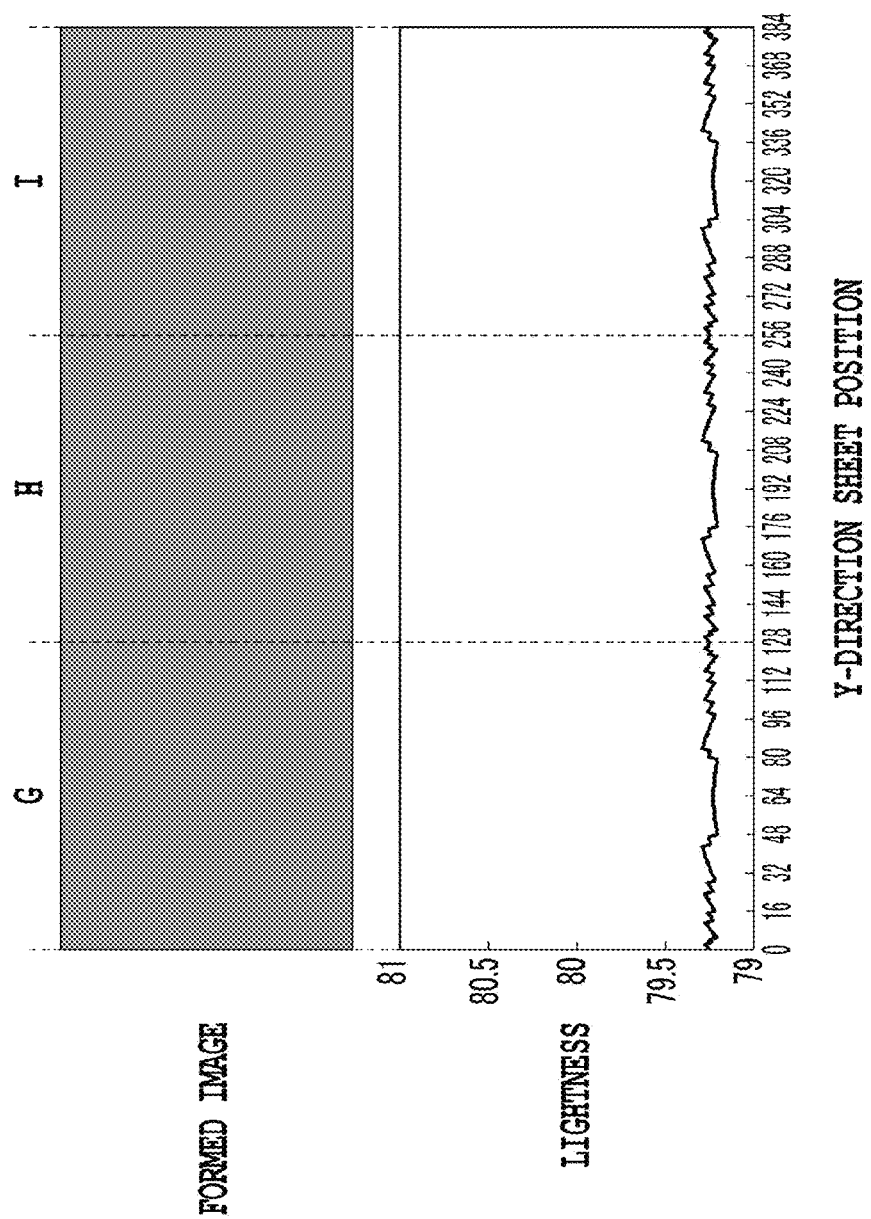
FIG. 19B is a figure that shows the image obtained when printing is performed using mask patterns of the third embodiment on which double impacts are carried out, and the lightness distribution corresponding to that image.

FIG. 19B illustrates a print image printed using mask patterns 261 and 262, at which such double impacts are carried out, and also shows the lightness distribution corresponding to the print image. The lightness of the print image is approximately uniform along the direction of the ejection port array. Also, concerning the bands (image areas G, H, I) printed by each scan, lightness variation at the central vicinity of the direction of the ejection port array is suppressed.

As described above, mask patterns 261 and 262 of the present embodiment, make it possible to suppress image deterioration due to conventional conveyance error and landing error, by the print permission ratio being nonuniform along the direction of the ejection port array and having a gradation heading from the central portion of the print head towards the ends. Furthermore, by the ratio by which double impact pixels are included at the central vicinity of each band being higher than the ratio by which double impact pixels are included at the end portions of each band, it is possible to suppress density decline caused by temperature variation within an ejection port array of the print head.

The optimal mode of how to set up the masks is in large part dependent on the relationship between the mask type and the temperature rise characteristics of the print head. Thus it is preferable that the most suitable mask be chosen for each print mode, of differing masks or differing print duty per 1 scan, and for each print head. In this manner, in the case where an ink jet printing apparatus has multiple print modes of differing print duties, pixels having an increased number of ink impacts at the same location are formed by the respective print modes of differing duties. Thus printing control may be carried out such that, for each printing mode, the location of pixels at which the number of ink impacts at the same location is increased differs. The embodiments above were described in respect to a case in which temperature rise was symmetrical at the central portion along the direction of the ejection port array. However, in the case where it is understood that temperature distribution does not have symmetry along the alignment direction due to device factors such as that caused by ink path construction, etc., or due to control factors such as mask pattern distribution along the ejection port array alignment direction, the locations at which double impacts are carried out may be unsymmetrical.

Fourth Embodiment

A fourth embodiment will be explained next. It should be noted that parts that are configured the same as the above described first through third embodiments have been given the same reference numeral within the figures, the corresponding explanation has been omitted, and that explanation is given only with respect to parts that differ.

At the above embodiments, explanation was made with respect to methods of carrying out printing via 2-pass printing. The print head shown in FIG. 2A has a configuration provided with multiple ejection port arrays that eject the same color of ink. In the above described embodiments, explanation was made while supposing a configuration provided with 1 ejection port array of each color, however, in the present embodiment explanation will be made with respect to a print head provided with a plurality of nozzle arrays, along the direction that crosses the direction in which the nozzles are aligned, that eject the same color of ink. In greater detail, explanation will be made with respect to a printing method wherein printing is carried out via 1-pass printing, and the printed image does not overlap at each scan.

Figure 21:
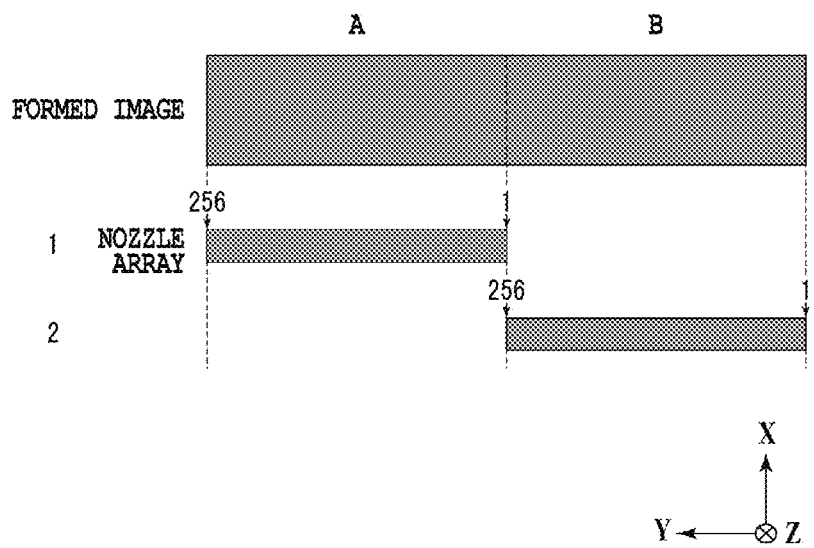
FIG. 21 is a diagram for explaining the positional relationship between the print head and the print image on the print medium, when printing is performed by a printing method of a fourth embodiment of the invention.

FIG. 21 is a diagram that explains the positional relationship between the print medium and print head of the present embodiment. At the first scan the print head uses ejection ports 1 to 256 and prints while scanning in the +X direction. After that scan, the print medium P is conveyed 256 dot-portions in the +Y direction, at 600 dpi. At the second scan the print head uses ejection ports 1 to 256 and prints while scanning in the −X direction. After this scan the print medium P is discharged and printing is completed. In this manner print image areas A and B are completed by single scan printing.

Figures 22A, 22B:
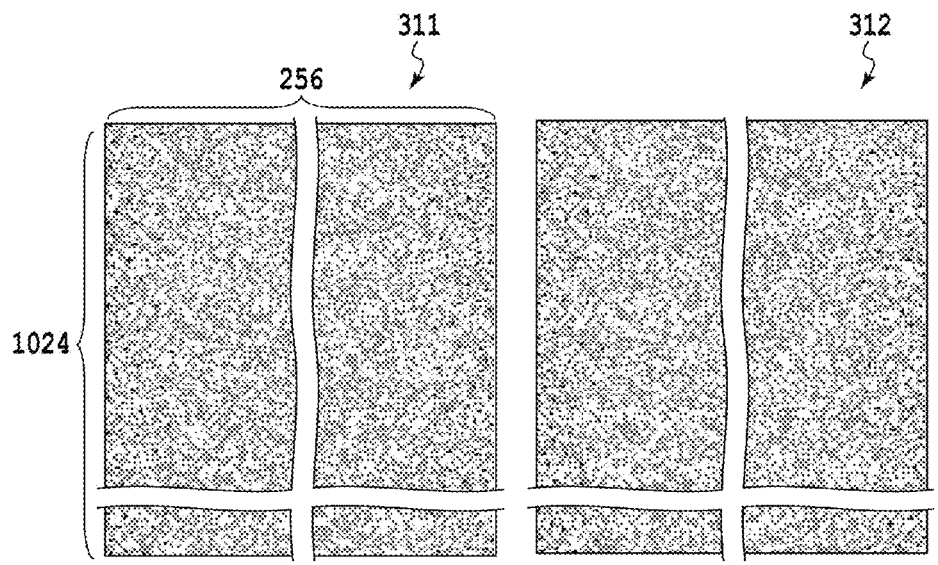
FIGS. 22A to 22C are figures that show masks used when printing is performed by the printing method of the fourth embodiment.
Figure 22C:
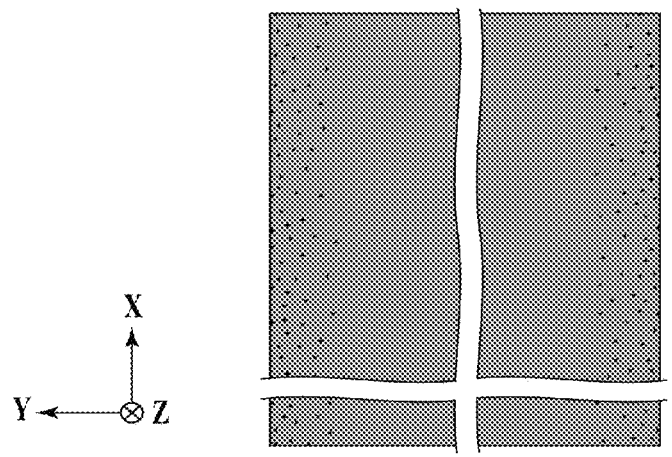

FIGS. 22A to 22C illustrate masks used in the present embodiment. FIG. 22A is the mask pattern 311, used with respect to the ejection port array A of the print head shown in FIG. 2A, and FIG. 22B is the mask pattern 312 used with respect to the array H. As for the size of the mask patterns, the Y direction is 256 (number of ejection ports) and there are 1024 in the X direction. FIG. 22C is the print image that is the result of overlapping the print images due to the respective ejection port arrays, in the case of printing an image with a 100% printing ratio using masks 311 and 312.

In the printing of the present embodiment as well, the temperature rise value varies according to the location of the ejection port on the print head. Thus, in the case of carrying out high print duty printing, the ejection amount of the ink ejected from an ejection port varies according to the location of the ejection port, and the dot diameter of the ink drops vary along with this. Thus, the density and lightness of the print image varies along the direction of the ejection port array. Because of this, in the present embodiment as well, the respective mask patterns are established such that double impacts occur with respect to the portions where the amount of ink ejected from the ejection ports is comparatively small, and the dot diameters are small.

Figure 23A:
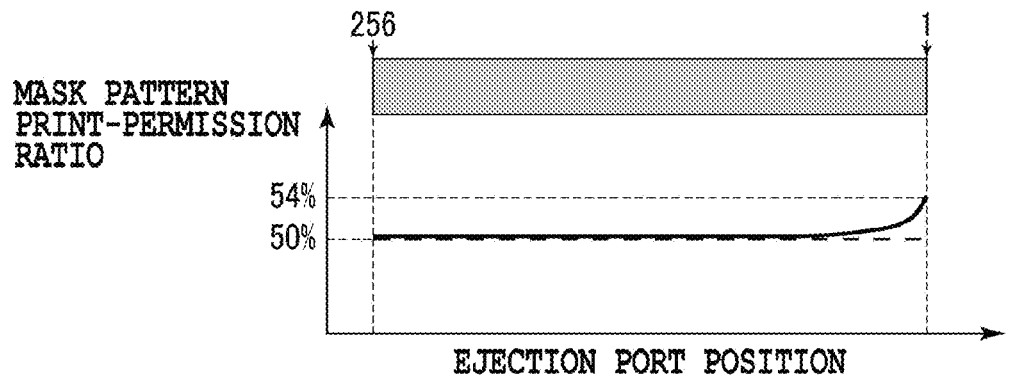
FIGS. 23A to 23C are graphs with the vertical axis representing mask pattern print permission ratio and the horizontal axis representing ejection port position, when printing is performed by the printing method of the fourth embodiment.
Figure 23B:
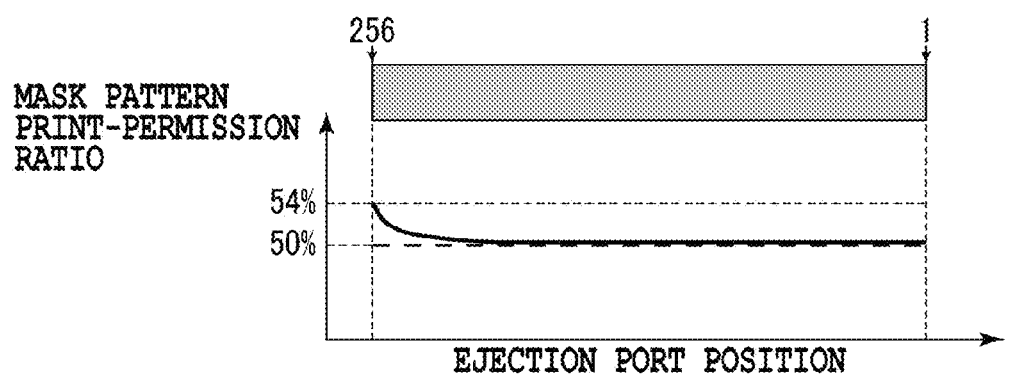
Figure 23C:
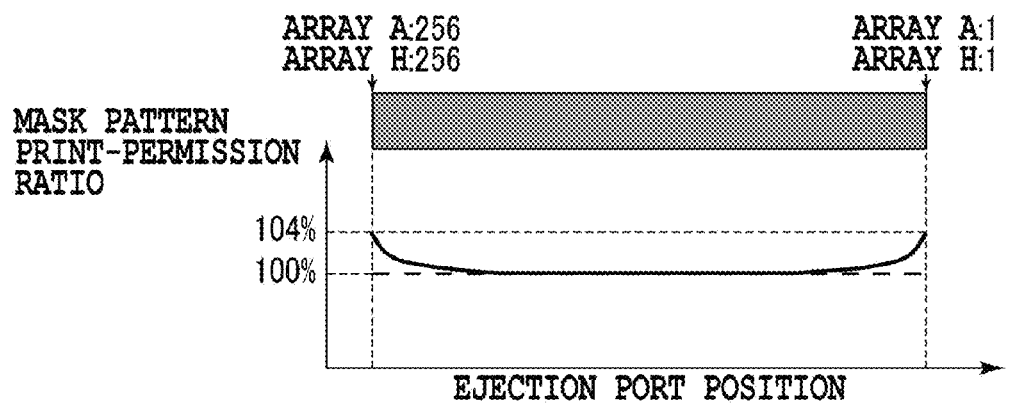

FIGS. 23A to 23C illustrate the print permission ratios of the mask patterns of the respective masks. FIG. 23A shows, with respect to ejection port array A, the print permission ratios along the ejection port alignment direction, of a mask that does not carry out double impacts and the mask pattern 311 that carries out double impacts. The dotted line is, as an example for comparison, a mask pattern that does not carry out double impacts, and the solid line is the mask pattern 311 that does carry out double impacts. In contrast to the print permission ratio of the mask that does not carry out double impacts being a uniform 50% from ejection port 1 to ejection port 256, the print permission ratio of the mask pattern 311, which carries out double impacts, is not uniform. The print permission ratio of the mask pattern 311, which carries out double impacts, becomes a largest 54% at the ejection port 1 at the end of the direction of the ejection port array, and decreases from there as bearing towards the central portion of the ejection ports. En route to ejection port 256 the print permission ratio is a uniform 50%. In other words, the mask pattern is established such that the most double impacts are generated by the ejection ports at the end of the direction of the ejection port array.

FIG. 23B shows, with respect to ejection port array H, the print permission ratios along the ejection port alignment direction, of a mask pattern that does not carry out double impacts and the mask pattern 311 that carries out double impacts. As the respective mask patterns shown at FIG. 23B are the same as a mirror image of the mask pattern that does not carry out double impacts and the mask pattern 311 that does carry out double impacts, shown at FIG. 23A, the corresponding explanation has been omitted.

FIG. 23C shows print permission ratio along the ejection port alignment direction, when the mask patterns that carry out double impacts each other, have been superimposed, and when the mask patterns that do not carry out double impacts, have been superimposed. The print permission ratio of the superimposed mask patterns that do not carry out double impacts are a uniform 100% overall, along the direction of alignment of the ejection ports. In contrast, the print permission ratio of the combined mask patterns 311 and 312, which carry out double impacts, is 104% at the areas printed using the ends of the direction of the ejection port array.

As a result, regarding the area printed using mask patterns 311 and 312, which carry out double impacts, at the area where the ends of the ejection port array are used, the pixels of each of the mask patterns, which are printed at 1 scan, complement each other. Because of this, the print permission ratio at that area is approximately 100%. However, at the area where ejection ports of the central portion are used, the mutual mask patterns complement each other via the pixels printed at 1 scan, and in addition to print permission ratio of the once impacted pixels being approximately 100%, double impact pixels are also included at a ratio of 4%.

In this manner, density decline is suppressed by way of generating print data such that double impact pixels are included at the area printed by ejection ports located at the ends of the ejection port array. double impact pixels are formed, by carrying out the ejection of ink using the respective ejection ports on the different ejection port arrays, at the area where print image density decline occurs easily, and the print image density decline may be suppressed by way of this. Due to this, because it becomes unnecessary to perform multiple scans of the print head at the same area, it is possible to decrease the number of scans of the print head, and it is possible to improve the throughput of the print head.

Fifth Embodiment

A fifth embodiment will be explained next. It should be noted that parts that are configured the same as the above described first embodiment through fourth embodiment have been given the same reference numeral within the figures, the corresponding explanation has been omitted, and that explanation is given only with respect to parts that differ.

Figure 24:
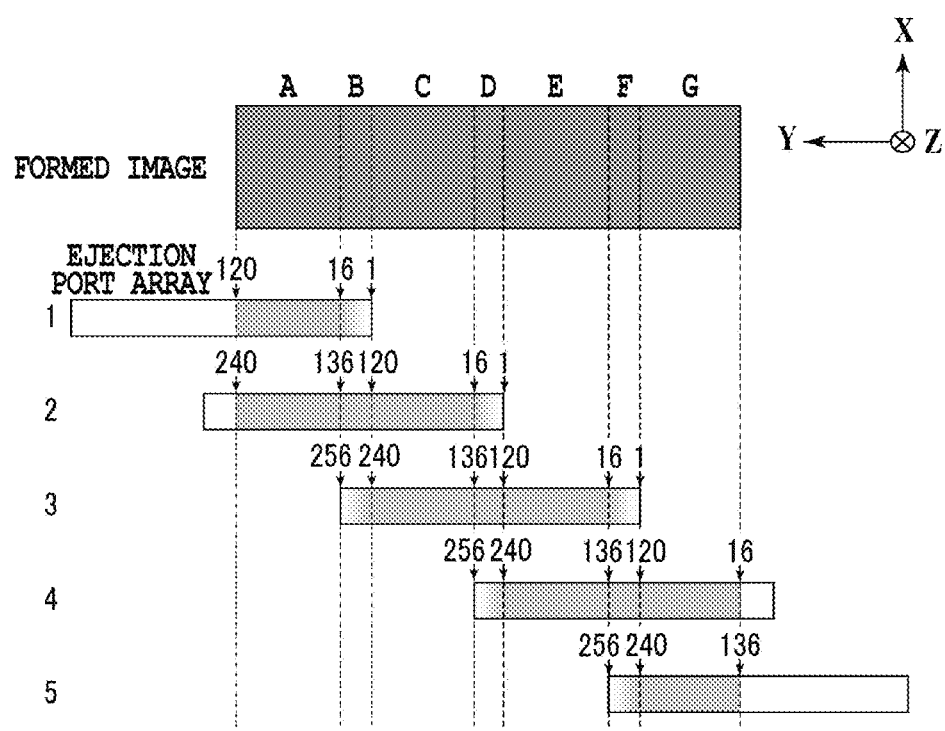
FIG. 24 is a diagram for explaining the positional relationship between the print head and the print image on the print medium, when printing is performed by an ink jet printing apparatus of a fifth embodiment of the invention.

At the above described first through fourth embodiments, printing was carried out by 1-pass or 2-pass printing at a prescribed print region, however, the number of print scans was fixed across the entire print medium. In contrast, in the present embodiment, as shown at FIG. 24, the number of scans when printing at one area is set larger than at other areas. In the present embodiment, 3-pass printing is carried out, via 3 scans, at the area printed using ejection ports located at the ends of the direction of the ejection port array. And at areas other than that 2-pass printing is carried out via 2 scans. Again, with respect to ejection ports at the ends of the ejection port arrays of the print head, a mask pattern is used such that print permission ratio decreases as location at which ejection ports are formed approaches the ends. Thus, even if an error in the amount of conveyance occurs, it is possible to disperse density offset in the print image around the boundaries of the areas printed at each scan, and to suppress density unevenness. It is also possible to suppress image deterioration caused by an undesired shift in the landing position of ink ejected from ejection ports at the ends of the print head, due to an air current.

Furthermore, it is possible to suppress density unevenness that occurs due to the temperature rise being uneven within an ejection port array of the above described print head, by generating print data such that double impact pixels are present. Detailed explanation will be made with respect to this next.

The printing operations of the present embodiment will be explained next. First, at the initial scan, printing is performed while the print head scans in the +X direction, using ejection ports 1 to 120, among the 256 ejection ports of the print head. After the scan, the print medium P is conveyed 120 dots at 600 dpi, in the +Y direction. In actuality the print medium P is conveyed in the +Y direction after 1 scan of the print head has completed, but at FIG. 24, for the purpose of explanation, the print head is shown to move in the −Y direction. In this manner the relative positional relationship between the print head and the print medium is illustrated.

Next, at the second scan, printing is performed while causing the print head to scan in the −X direction, using ejection ports 1 to 240. After this scan, the print medium P is conveyed 120 dots at 600 dpi, in the +Y direction. At the third scan, printing is performed while causing the print head to scan in the +X direction, using ejection ports 1 to 256. After this scan, the print medium P is conveyed 120 dots at 600 dpi, in the +Y direction. At the fourth scan, printing is performed while causing the print head to scan in the −X direction, using ejection ports 17 to 256. After this scan, the print medium P is conveyed 120 dots at 600 dpi, in the +Y direction. At the fifth scan, printing is performed while causing the print head to scan in the +X direction, using ejection ports 137 to 256. After this scan the print medium P is discharged and printing is completed. In the image formed by the above described operations, areas A, C, E and G are respectively printed by 2 print scans, and areas B, D, and F are printed by 3 print scans. Printing of an image is completed in this manner by conveyances of the print medium and multiple scans.

Giving attention to areas A, C, E, and G, an image is formed by causing the print head to scan 2 times at these areas. At these 2 scans, ejection ports at neither of the ends of the alignment direction of the print head are used; printing occurs using only ejection ports at the central portion (non end portion ejection ports). On the other hand, giving attention to areas B, D, and F, an image is formed by causing the print head to scan 3 times at these areas. In the present embodiment, an image is printed using ejection ports at the ends of the print head, at 2 out of the 3 scans, and at 1 scan an image is printed using only ejection ports at the central portion, without using ejection ports at the ends of the print head. It should be noted that the number of scans of the print head at the areas B, D, and F is larger than the number of scans of the print head at areas A, C, E and G. In the present embodiment control is performed such that there is one more scan at the areas B, D and F.

At FIG. 24, with respect to the ejection ports formed at the ends of the print head, the mask pattern print permission ratio is established such that the number of ejection ports that eject ink gradually decreases as approaching the ends. Accordingly, the amount of ejected ink gradually decreases as approaching the ends of the ejection port arrays of the print head. As described above, at the areas B, D, and F, the number of ink drops ejected at 1 scan, from the ejection port group included at the ends of the ejection port array, becomes smaller as approaching the ends of the ejection port array, along the direction of alignment of the ejection ports.

When the print data to be printed on the print medium is assumed to be a 100% solid image, at the areas B, D, and F, at the ends of the ejection port group, 50% is printed when the printing of the first scan and the printing of the 3rd scan at FIG. 24 are combined. When this 50% of the printing is combined with the other 50% of the printing caused by the ejection ports formed at the central portion of the print head, at the second scan, 100% of the printing at this area is performed. As shown at FIG. 24, the printing of the first scan and the printing of the 3rd scan complement each other by way of changing, to the opposite direction, the direction in which the number of the ejection ports, that perform the ejections of ink at the respective scans, increase (and decrease). As described above, in the present embodiment, at the printings of areas B, D, and F, at the time of the first scan and third scan, mask patterns are used such that the number of ejection ports on the print head that eject ink gradually decreases as approaching the end portion of the print head. Printing is carried out between the first scan and the third scan, by way of complementing the ink ejections of the respective scans via the pixels of the ink drops ejected from ejection ports at both ends of the ejection port array. Thus, even where print image density has changed due to the occurrence of an error in the amount conveyed, the print image alteration caused by the error is dispersed inside the overlapped portion, at the area printed by the 1st scan and the area printed by 3rd scan. Thus, it is possible to carry out printing such that sharp local density increases are suppressed, and such that a change in the print image density does not stand out.

FIGS. 25A to 25C and FIGS. 26A to 26D illustrate the masks used in the above described operations. Similarly to the previous embodiments, ink is ejected at locations where there is agreement between print permitted pixels of the mask pattern (the gray pixels and black pixels) and the print data. With respect to multiple mask patterns, gray pixels denote the locations of pixels where the ejection of ink is permitted at 1 mask pattern, and black pixels denote the locations of pixels where the ejection of ink is permitted at 2 or more mask patterns.

Figures 25A, 25B, 25C:
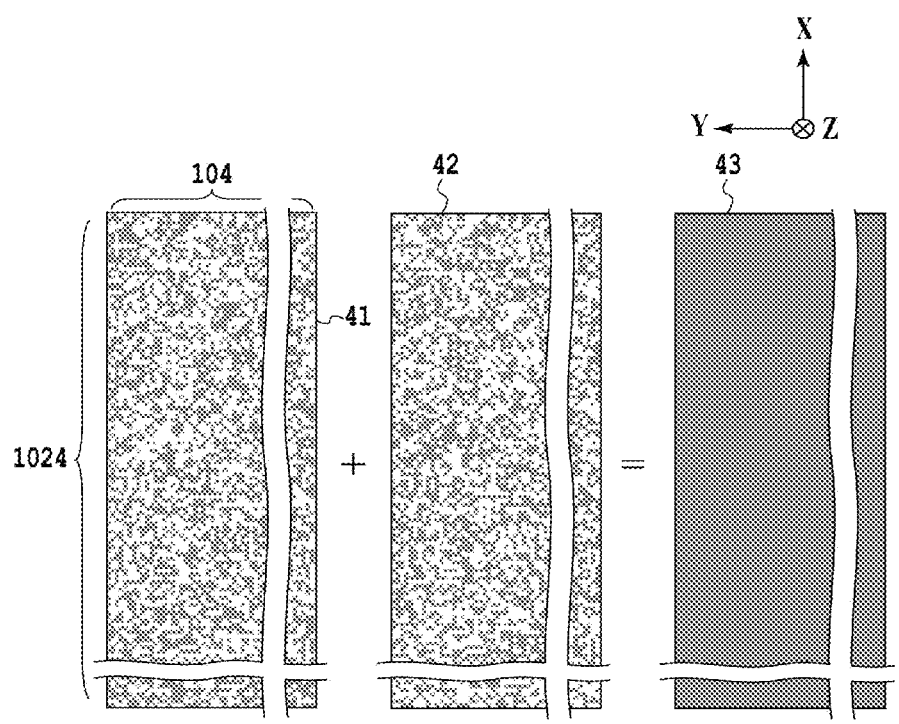
FIGS. 25A to 25C are figures that show the masks that are used when printing the areas of the print image of FIG. 24 that are printed by 2 scans.

FIGS. 25A and 25B are mask patterns used in the 2-pass printings, as shown by areas A, C, E and G of FIG. 24, wherein printing is carried out by 2 scans of the print head. A 100% solid image, as shown at FIG. 25C, is printed via the respective ink drop ejections carried out at the 2 scans complementing each other.

FIGS. 25A to 25C are mask patterns 41 where the 1st scan is printed using ejection ports 17 to 120, and FIG. 25B is a mask pattern 42 where the 2nd scan is printed using ejection ports 137 to 240. These masks are for forming a print image at each area by 2 scans. As for the size of the mask patterns used in the present embodiment, the Y direction is 104 (number of ejection ports) and there are 1024 in the X direction. In the case where the image data is greater than 1024, masks are repeated and used, in units of 1024. An image 43, at which the mask patterns 41 and 42 have been overlaid and a logical OR operation taken, is shown at FIG. 25C. The images at the areas A, C, E, and G are completed by a 2-scan printing using these 2 masks shown in FIGS. 25A and 25B.

Figures 26A, 26B, 26C, 26D:
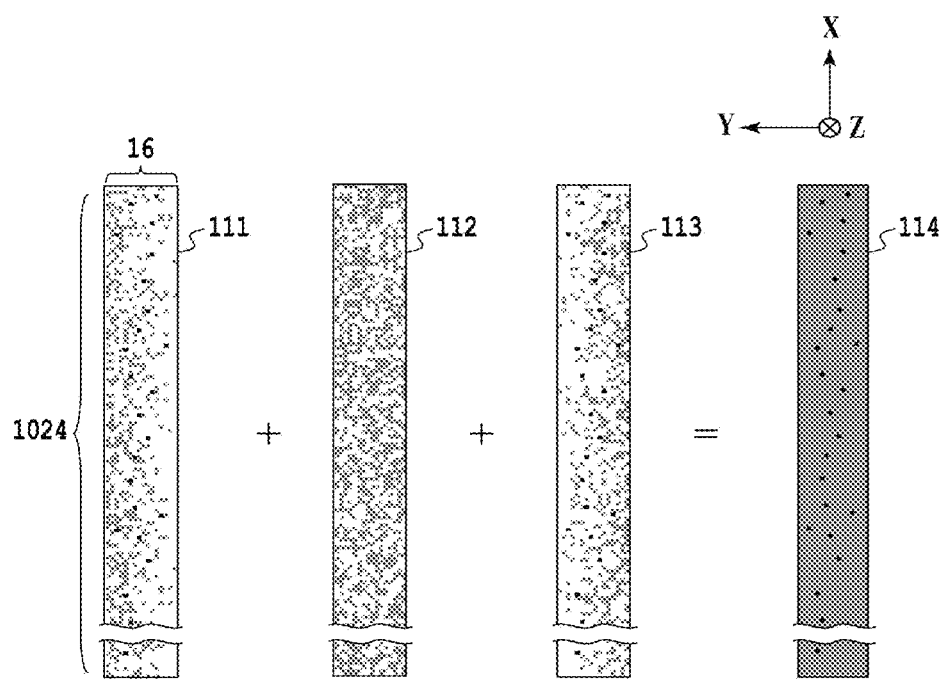
FIGS. 26A to 26D are figures that show the masks that are used when printing the areas of the print image of FIG. 24 that are printed by 3 scans.

FIGS. 26A to 26D show masks used at the areas printed by 3 scans, as at areas B, D, and F of FIG. 24. FIG. 26A is a mask pattern 111 when printing the first scan using ejection ports 1 to 16. FIG. 26B is a mask pattern 112 in the case of printing the second scan using ejection ports 121 to 136. FIG. 26C is a mask pattern 113 in the case of printing the third scan using ejection ports 241 to 256. FIG. 26D is the image 104, which shows the result of overlaying the 3-pass masks 111, 112 and 113, and taking a logical OR operation. The relationship, when forming an image, between print medium conveyance and the ejection ports that are used is the same as that of FIG. 24.

As for the size of the 3-pass mask patterns used in the present embodiment, they have a length of 16 (number of ejection ports) dots in the Y direction, and 1024 dots in the X direction. In the case where the image data is greater than 1024 in the X direction, masks are repeated and used, in units of 1024. When these 3 masks shown at FIGS. 26A to 26C are overlaid, they have a relationship wherein printing is permitted at all of the pixels, and the images at the areas B, D, and F of FIG. 24 are completed by 3 scans. Here, at the masks shown at FIGS. 26A and 26C, printing is carried out using ejection ports formed at the end vicinity of the print head. The masks shown at FIGS. 26A and 26C are established such that the mask pattern print permission ratio decreases as approaching a location near the end of the print head.

Figure 27A:
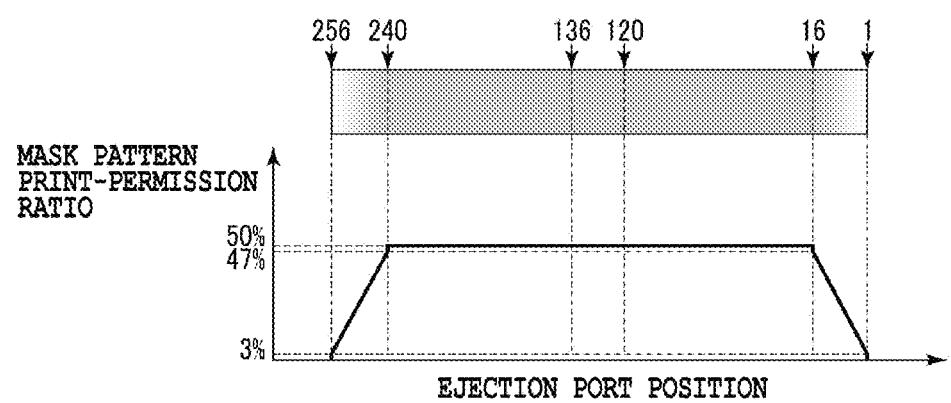
FIG. 27A is a graph with the vertical axis representing mask pattern print permission ratio and the horizontal axis representing ejection port position, when printing is performed by an ink jet printing apparatus of a fifth embodiment of the invention.

Attention will now be given to the case where the 3 scans of FIG. 24 are printed using all of the mask patterns 41, 42, 51, 52 and 53. FIG. 27A illustrates mask pattern print permission ratio, for this case, according to each ejection port of an ejection port array. The print permission ratios of the mask patterns corresponding to both ends of the ejection port array (ejection port 1 and ejection port 256) are 3%, and from there the print permission ratios mutually increase as heading towards the central portion of the ejection port array. And, the print permission ratio, which permits the ejection of ink, becomes 47% at 16 ejection ports from both ends of the ejection port array (ejection port 16 and ejection port 241). The print permission ratio corresponding to the remaining central portion ejection ports (ejection port 17 to ejection port 24) is a uniform 50%. As for the mask patterns used at the areas where 3 pass printing is carried out, the print permission ratios of the mask patterns corresponding to ejection ports at the end of the ejection port array are low. Thus, density change that appears when an error occurs in conveying the print medium in the Y direction, and landing position error of ink drops ejected from ejection ports at the ends of the print head, are dispersed at the portion where the regions printed by the end vicinities of the ejection port array overlap, and it is possible to suppress density variation.

Figure 27B:
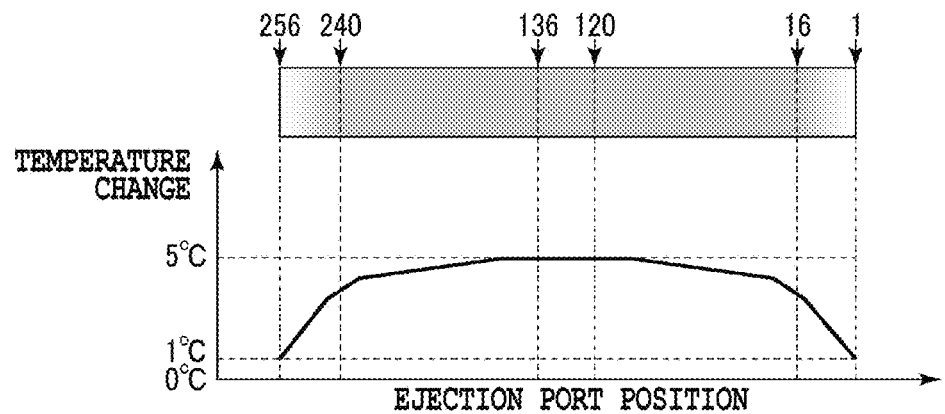
FIG. 27B is a graph with the vertical axis representing print head temperature change and the horizontal axis representing ejection port position, when high duty printing has been performed by an ink jet printing apparatus of the fifth embodiment of the invention.

Furthermore, by using the mask pattern group shown at FIGS. 26A to 26D, it is also possible to suppress density unevenness caused by temperature variation along the direction of the ejection port array of the print head, occurring in the case where continued high duty printing is carried out. FIG. 27B illustrates, with respect to 100% image data wherein data exists at all of the pixels, temperature variation within the ejection port array, occurring directly after the start of printing, when printing using the 3rd mask of FIG. 24. In contrast to the temperature at the central portion of the ejection port array rising 5 degrees, the temperature at the ends of the ejection port array rises 1 degree, and the temperature rise at the ends is smaller than the temperature rise at the central portion. As described above, according to the print permission ratio distribution of the mask pattern, the print duty per 1 scan, at the ends of the ejection port array, is not very high in comparison to the central portion of the ejection port array. This is because heat dissipation at the end portions is high, in comparison to the central portion, and because heat can more easily dissipate at the ends of the ejection port array. And, as shown at FIG. 7, there is a relationship between temperature distribution and ejection amount, the ejection amount becoming larger as temperature becomes higher, which is connected to density unevenness in the print image.

Because of this, in the present embodiment, as shown by the arrangement of mask patterns 111 to 113, used in the 3-pass printing of the present embodiment of FIGS. 26A to 26C, in these figures in which, at mask patterns 111 and 113, black pixels exist that denote the permission of the ejection of ink 2 or more times, at the black pixels, at mask patterns 111 and 113, that is, at the printing operation of the 1st pass and the 3rd pass, ink is ejected. In other words, in comparison to the gray pixels shown at FIG. 26D, at which the ejection of ink is permitted at 1 out of the 3 scans, the ejection of ink is permitted at 2 out of 3 scans at the black pixels. And, these black pixels are set up such that more of them exist at the central portion of the mask than the end portions, in the Y direction of the masks of FIGS. 26A and 26C. As described above, the ratio of print permitted pixels (print permission ratio) of the mask patterns used with respect to areas A, C, E and G printed by 2 passes using ejection ports at the central portion of the ejection port array is 100%, and all of the pixels are print permitted, by 1 of the mask patterns. On the other hand, the total print permission ratio of the mask patterns used with respect to areas B, D and F printed by 3 passes using ejection ports at the ends of the ejection port array is larger than 100%, and pixels are present that are print permitted by 2 or more mask patterns. In other words, the mask patterns, used with respect to areas B, D and F printed using ejection ports at the ends of the ejection port array, have a larger number of pixels at which ink is impacted 2 or more times at the same pixel, than the mask patterns used with respect to areas A, C, E and G printed using ejection ports and the central portion of the ejection port array.

Figure 28A:
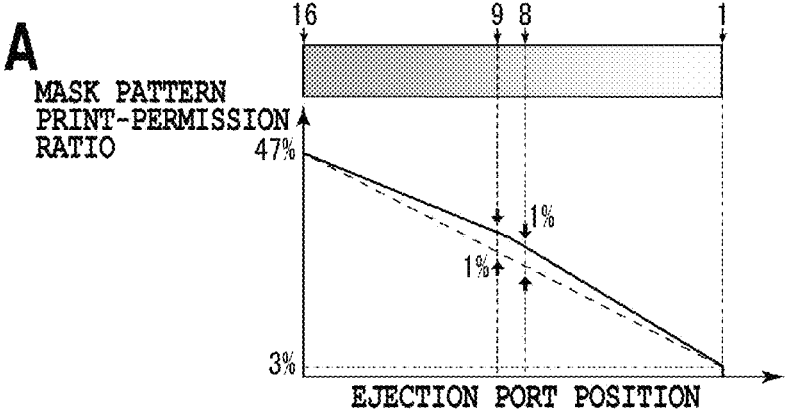
FIGS. 28A to 28C are graphs with the vertical axis representing mask pattern print permission ratio and the horizontal axis representing ejection port position.
Figure 28B:
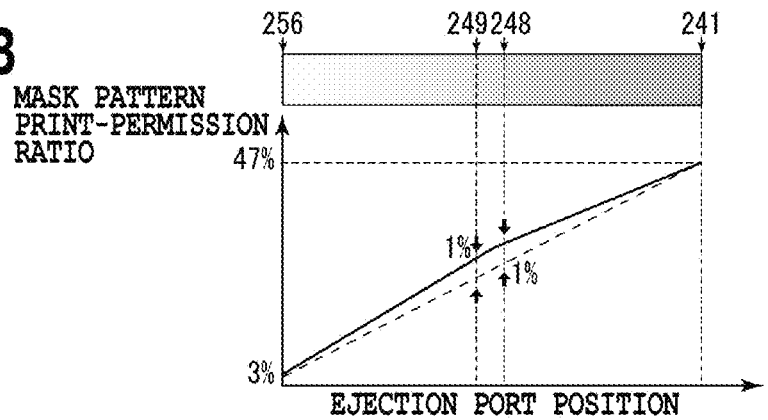
Figure 28C:
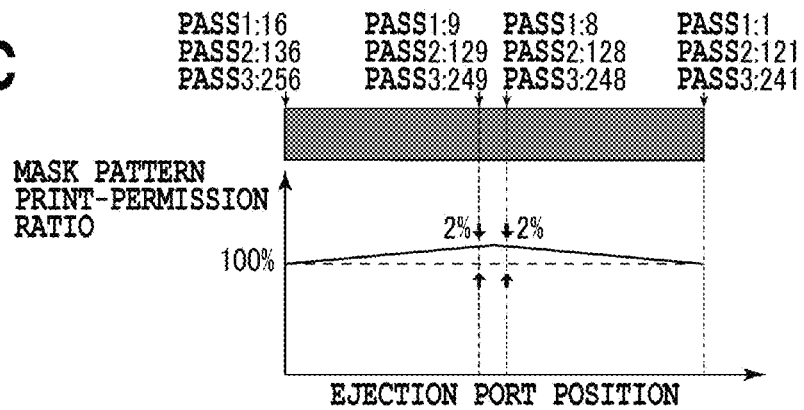

The mask patterns used in the present embodiment will be explained by making use of FIGS. 28A to 28C. In FIGS. 28A to 28C the vertical axis represents mask pattern print permission ratio of ejection ports that carry out the ejection of ink, and the horizontal axis represents ejection port location. FIG. 28A shows mask pattern print permission ratio along the direction of the ejection port array, of a 3-pass mask used in a printing that does not perform double impacts among the 3 scans (the dotted line), and of the 3-pass mask 111 when double impacts are carried out that perform printing at the same location, at 2 scans out of the 3 scans (the solid line). At the mask pattern at which double impacts are not carried out, the print permission ratio of the mask pattern increases linearly from 3% to 47%, from ejection port 1 to ejection port 16.

At the mask pattern 111 at which double impacts are carried out, the tendency of the print permission ratio of the mask pattern increasing from 3% to 47%, from ejection port 1 to ejection port 16, is the same. However, at the central vicinity of the mask 111, around ejection port 8 and ejection port 9, the print permission ratio of the double impact portion of the mask, only, becomes larger than that of the mask that does not carry out double impacts. The mask pattern print permission ratio difference, when a solid image is printed, between performing printing with a mask in which double impacts are not performed and the mask 111 in which double impacts are performed, is at its largest, at 1%, at ejection port 8 and ejection port 9. From there, the difference in print mask pattern permission ratio, of the ink ejection ports that perform the ejection of ink, becomes smaller as heading towards the ends of the print head, and the difference becomes 0% at ejection port 1 and ejection port 16. That is, the arrangement of the mask pattern 111 is such that there are not double impact pixels at the ends of the print head, where ejection port 1 and ejection port 16 are used, and such that the most double impact pixels are present at the central vicinity of the print head, where ejection port 8 and ejection port 9 are used.

FIG. 28B is a diagram that illustrates print permission ratio of mask pattern along the ejection port alignment direction, of a 3-pass mask for the case where double impacts are not carried out (dotted line) and of the 3-pass mask 113 for the case where double impacts are carried out (solid line). Because the mask used for the printing without double impacts and the mask 111 used for printing with double impacts are respectively the same as a mirror image of the masks of FIG. 28A, the corresponding explanation has been omitted. FIG. 28C illustrates print permission ratio of mask pattern along the direction of alignment of the ejection ports, when the masks used for carrying out 2-pass printing and the masks used for carrying out 3-pass printing have been overlaid.

As shown by the dotted line of FIG. 28C, print permission ratio of the mask pattern combined 2-pass masks and 3-pass masks, at which double impacts are not carried out, is a uniform 100% along the direction of alignment of the ejection ports.

In contrast, as shown by the solid line of FIG. 28C, print permission ratio of the mask pattern combined 2-pass masks at which double impacts are carried out and the 3-pass masks 111 to 113 at which double impacts are carried out, has become 102% at the area printed using the central portion of the masks. As a result, the mask patterns have become such that the ejection of ink is permitted at all pixels within the area printed using the 3-pass masks 111 to 113. And the print permission ratio is 100% with respect to the ejection ports at the ends of the print head. Also, with respect to the ejection ports at the central portion of the print head, the print permission ratio is 102% (the 51% of the 3-pass mask 111 + the 51% of the 3-pass mask 113), and double impact pixels are present.

Using the above described 3-pass masks 111 to 113, in a state where a difference in dot diameter range occurs along the direction of the ejection port array, at FIG. 24 an image is shown that is formed by the print method shown in FIG. 24, as well as the lightness distribution of that image. Lightness variation is held down at the print areas I, K and M, formed by 3-passes.

By using a mask pattern group such that double impact pixels are present as described above, the difference in lightness between the 2-pass print area and the 3-pass print area was suppressed, when the inventor actually checked an image in the case where a print image was corrected. Graininess due to double impacts is also suppressed.

As a result, by using the 3-pass masks 111 to 113 introduced in the present embodiment, even in the case where a dot diameter range is generated along the direction of the ejection port array due to head temperature rise, it is possible to suppress density unevenness occurring because of a rise in lightness at the 3-pass print area.

In the 5th embodiment, explanation is made using dot diameters of ink ejected from 1 pl ejection ports, however, a similar nonuniform dot diameter distribution is also generated to some degree with respect to the 2 pl ejection ports and the 5 pl ejection ports.

Figure 29A:
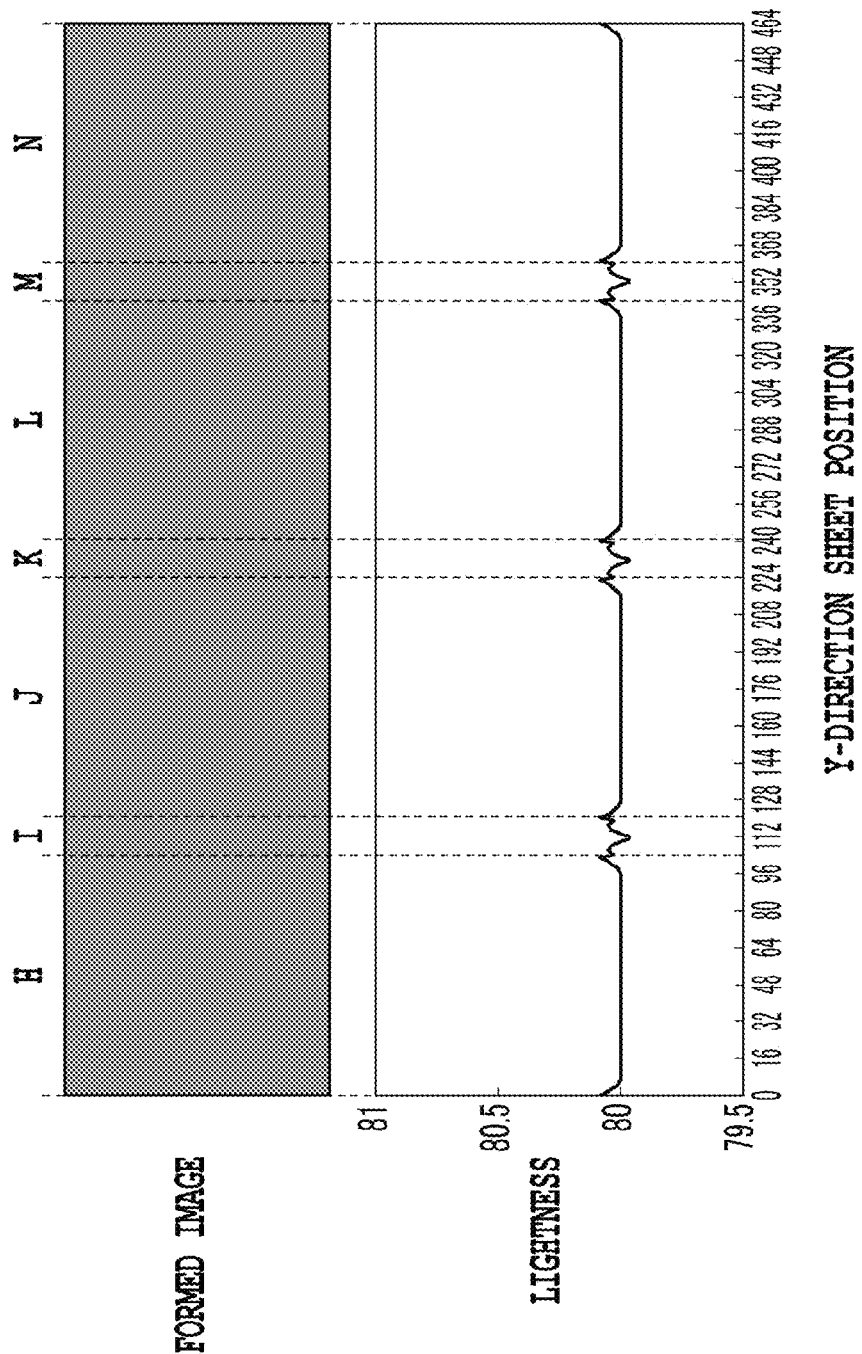
FIG. 29A is a plan view of the print area when printing is performed by the printing method of the fifth embodiment of the invention, and also illustrates a corresponding graph with the vertical axis representing lightness and the horizontal axis representing position on the print medium.
Figure 29B:
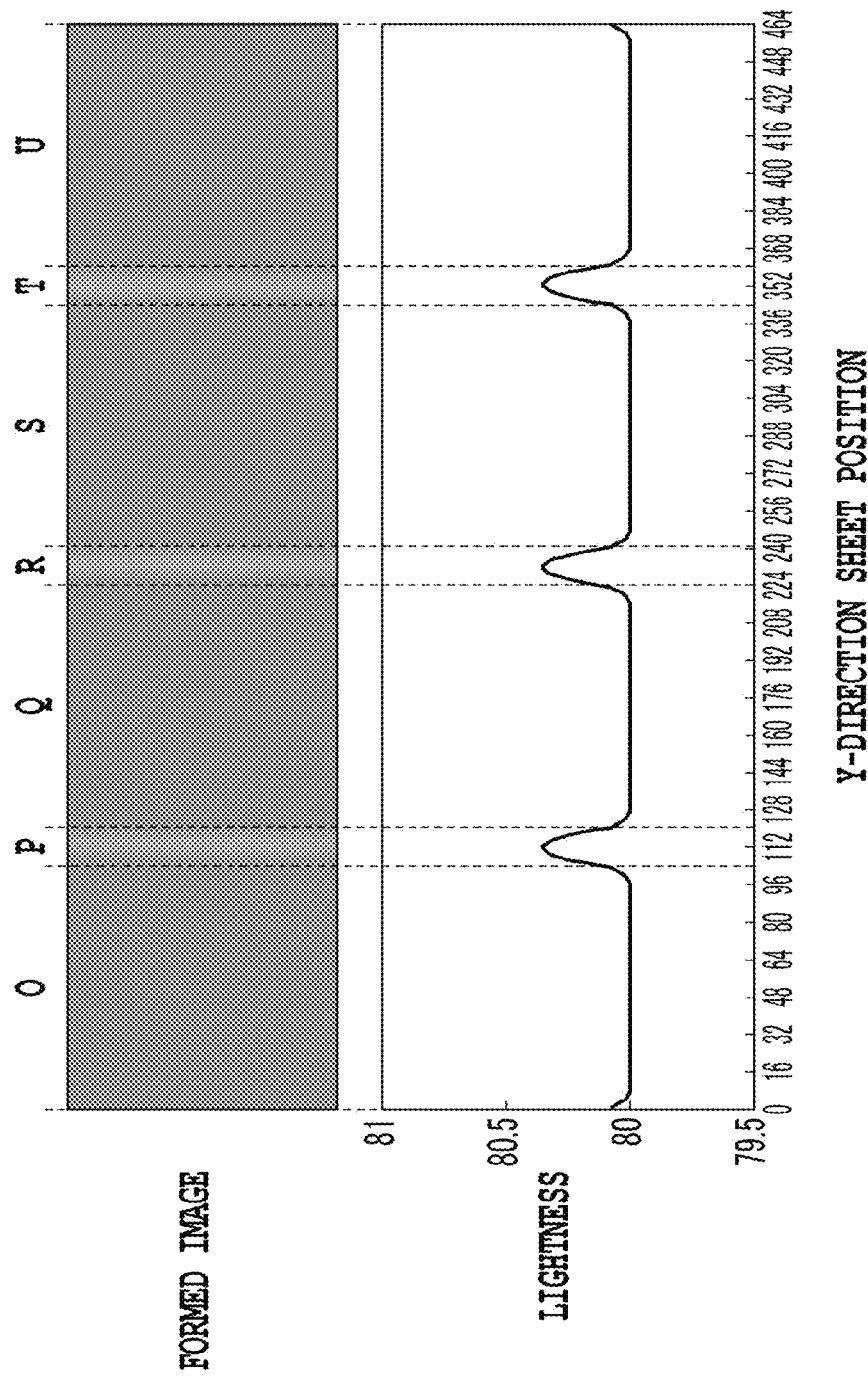
FIG. 29B is a plan view of the print area when printing is performed by the printing method of a comparative example, and also illustrates a corresponding graph with the vertical axis representing lightness and the horizontal axis representing position on the print medium.

Here, at FIG. 29B, as an example for comparison, a print image is shown in which double impact pixels are not created by the 1 pl ejection port array. It can be seen that lightness is high at the image areas P, R, and T, formed by 3 passes. This is because, at the area printed by ejection ports formed at the ends of the ejection port array with comparatively small dot diameters due to a low temperature rise and low temperature in comparison to the surroundings, the ink coverage ratio of the area is decreased, and the degree to which the white background appears has increased. And it can be understood that, with respect to the print areas P, R and T, that the lightness of the area printed using ejection port 8 and ejection port 248 has become higher than that of the area printed using ejection ports 1 and ejection port 256. This is caused by print permission ratio distribution of the mask pattern. The dot diameter of ejection port 1 (and ejection port 256) is comparatively small, but its print permission ratio is 3%. Out of the remaining 97%, 50% is printed by ejection port 121 at the central portion (as well as ejection port 136), and 47% is printed by ejection port 241 (and ejection port 16), which have dot diameters relatively close to those of the central portion. In other words, in the printed image dot diameters, for the most part, are comparatively large, and lightness does not increase very much. On the other hand, when using ejection port 8 and ejection port 248, from which ink having a comparatively small dot diameter is ejected, at a print permission ratio of 25%, the level of influence on the coverage ratio on the print medium is high. Thus, lightness is increased, and the vicinity around the middle regions of the print areas P, R and T become whiter.

It should be noted that in the case where printing is carried out according to the fifth embodiment, in the case of low duty print data such that head temperature increase is small and a temperature range within the ejection port array is not seen, it can be considered that, for the most part, a dot diameter range does not occur. This is for the same reason as in the previous embodiments; because printing is permitted by a plurality of mask patterns, and the number of pixels at which 2 or more ink drops is impacted is smaller in the case of printing a low duty image than in the case of printing a 100% solid image.

From the above, according to the present embodiment, in a printing using a group of ejection ports that includes ejection port array end portions and in which the number of passes of the print region are increased, double impacts of ink are performed in order to suppress density imbalance when performing a high duty printing such as that where the temperature distribution becomes nonuniform. Thus, even where the temperature of the print head has become nonuniform along the direction of alignment of the ejection port array, it is possible to suppress lightness variation because density imbalance can be suppressed, and it is possible to prevent the decline of print image quality.

In the present embodiment the masks for the 1st pass and the 3rd pass are selected as masks to generate double impacts. This invention, however, is not particularly limited as such; it may also be the 1st pass and the 2nd pass, the 2nd pass and the 3rd pass, or a 3-pass mask combination of the 1st pass, the 2nd pass and the 3rd pass wherein double impacts are generated at all of them. It is acceptable if double impacts are generated at a prescribed location of the completed image. As a reason for choosing the 1st pass and the 3rd pass in the present embodiment, although slightly, it was desired to raise print duty at the end vicinities of the ejection port array, and decrease the extent of the range of temperature rise within the ejection port array. And, because in the present embodiment bidirectional printing alternately repeats scans in the +X and −X directions, it was desired to choose passes printed in the same direction (it was desired to suppress the generation of a reciprocating registration displacement). As described above, print control is carried out such that pixels having an increased number of ink impacts at the same location are printed when scan is performed where the regions B, D, and F are printed by ink drops ejected from the end vicinity ejection port group. And print control is carried out such that, when impacting ink multiple times at the same area in order to form pixels with an increased number of ink impacts at the same location, ink is impacted at scans in the same direction.

As for the arrangement of the double impact pixels on the mask pattern, it is preferable that they be arranged such that they are dispersed well in respect to the main scanning direction of the print head, as shown at FIG. 26D, rather than being arranged at random. This is because, when double impact locations, as the result of a random distribution, concentrate locally at a given location, that location is perceived as a grain, and granularity decreases as a result.

Sixth Embodiment

A sixth embodiment will be explained next. It should be noted that parts that are configured the same as the above described first through fifth embodiments have been given the same reference numeral within the figures, the corresponding explanation has been omitted, and that explanation is given only with respect to parts that differ.

At the 5th embodiment a case was explained where a sloped mask was used at the end portion areas of the ejection port array. With respect to the characteristics of such a mask, it has a merit in that it is possible to avoid local stripes that are generated when there is a conveyance error of the print medium. On the other hand, one demerit is that the permitted range of the conveyance error is not the same in the case where the conveyance is short and the case where the conveyance is long. In general, a black stripe is generated in the case where the conveyance is short, and a white stripe is generated in the case where the conveyance is long. In the case of printing by overlapping the print area from the ejection port array including end portion, when a mask sloped in number of ink ejection is used at the end area of the ejection port array, local black and white stripes do not appear but the entire overlapped area becomes darker or whiter. In addition, at the area formed by the mask, whether, due to a conveyance error, the conveyed distance is long or short, from the change in the occupancy rate of the area, it is known that it has become whiter in comparison to when it has been conveyed correctly. Due to the 2 factors described above, print image change is offset by the overlapped portion of the print image becoming blacker when the conveyed distance is short due to a conveyance error and by it becoming whiter due to a change in coverage ratio due to mask shift. In contrast, in the case where conveyance distance is long, due to an error, the effect of the ejection port array overlapped portion becoming whiter, and the effect of the occupancy rate of the area changing due to a mask shift and the image becoming whiter, synergize, and the permitted amount of conveyance error in the case where the resultant conveyance is long, is short in comparison to the case where the conveyance is short. The prior art responded such as not to be influenced by this demerit, by way of making the overlapping ejection port array area as sufficiently long. However, because making the overlapping ejection port array area longer means that the area where the pass count is increased only the overlapping ejection ports becomes longer, this is connected with a decrease in throughput in serial type printers.

When putting an emphasis on throughput, if it is possible to permit, to a certain extent, the generation of local stripes, it is better suited that the overlapped portion uses a mask that does not have a slope in number of ink ejection. Stripes are generated at the boundary of the overlapping portion, and the problem concerning variation of the occupancy rate of the area due to mask shift remains, but it is possible to suppress the occurrence of the phenomenon where the middle of the overlapping portion becomes blacker or whiter due to a conveyance error. As for the present embodiment, an example will now be explained that does not have an inclination, at the overlapping portion, in the number of ejection ports that perform the ejection of ink.

Figures 30A, 30B, 30C, 30D:
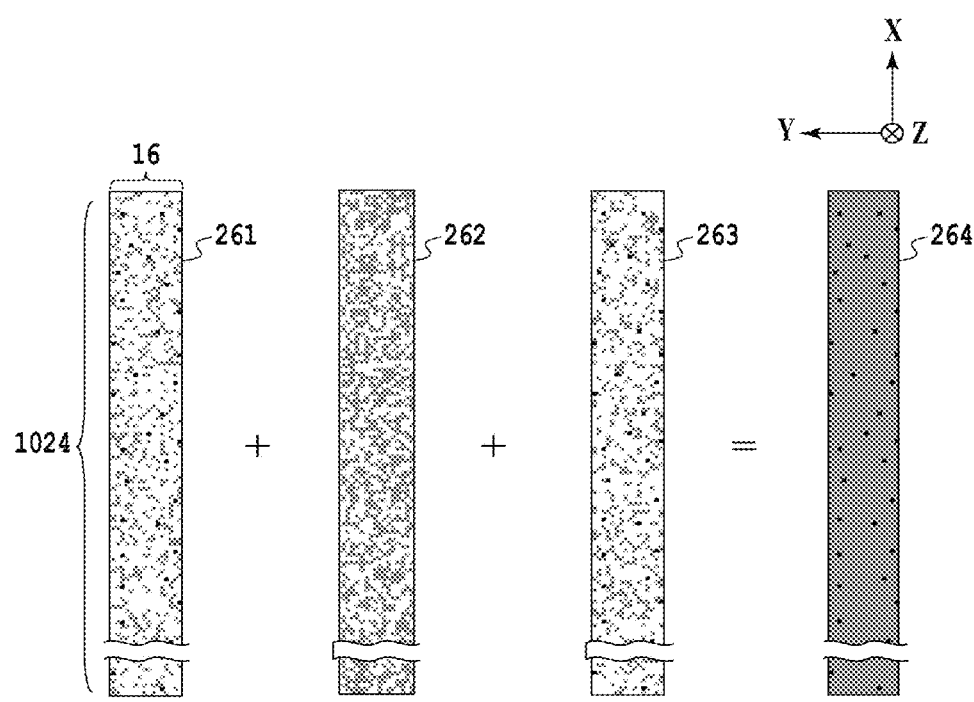
FIGS. 30A to 30D are figures that illustrate the respective masks used when printing at the print area at which printing is performed by 3 scans, when printing is performed by the printing method of a sixth embodiment of the invention.
Figure 31:
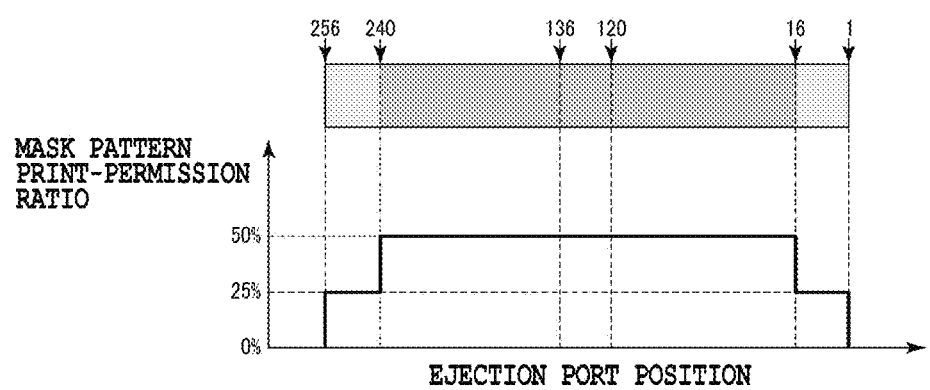
FIG. 31 is a graph with the horizontal axis representing ejection port position and the vertical axis representing mask pattern print permission ratio, in the case where double impacts are not carried out by the printing method of the sixth embodiment of the invention.

The basic structure of the ink jet printing apparatus explained at the present embodiment is the same as the basic structure described at the first embodiment. The masks used when carrying out printing according to the printing method of the present embodiment are shown at FIGS. 30A to 30C. At the portion of the print image that is formed by 3-pass printing, ink ejection is controlled and printing is performed using the 3 masks shown at FIGS. 30A to 30C. FIG. 30A is a 3-pass mask 261 when printing the first scan using ejection ports 1 to 16. FIG. 30B is a 3-pass mask 262 in the case of printing the second scan using ejection ports 121 to 136. FIG. 30C is a 3-pass mask 263 in the case of printing the third scan using ejection ports 241 to 256. FIG. 30D is the solid image 264, which is the result of superimposing the 3-pass masks 261, 262 and 263. The masks shown at FIGS. 30A to 30D have a complementary relationship, and complete the respective images at regions B, D, and F of FIG. 24 via 3 scans. FIG. 31 illustrates, in a case where later-described double impacts are not carried out, print permission ratios, of ejection ports that carry out ink ejection, on a mask pattern for the case of printing using all of the mask patterns, the 2-pass masks and the 3-pass mask 261, the 3-pass mask 262 and the 3-pass mask 263. The print permission ratios, of ejection ports that carry out the ejection of ink, of a mask pattern for the 16th ejection ports (ejection port 17 and ejection port 240) heading away from both ends of the ejection port array (ejection port 1 and ejection port 256) towards the central portion of the ejection port array, is 25%, and the remaining ejection ports (ejection ports 17 to 240) maintain 50%.

In the present embodiment, as shown at FIGS. 30A to 30D, double impact pixels are provided on the masks. That is, black cell locations are provided on the 3-pass mask 261 and the 3-pass mask 263 of the present embodiment. In the mask patterns, pixels shown by a gray cell appear only 1 time among the 3 print scans, while pixels shown by a black cell appear 2 times, once on the 3-pass mask 261 and once on the 3-pass mask 263. That is, the gray cell pixels shown at FIG. 30D are complemented via 3 printings, and in addition to that the black cell pixels are impacted twice. In the masks of FIGS. 30A and 30C, more of these black cell pixels appear at the end vicinities than at the central portion of the ejection port array.

Figure 32A:
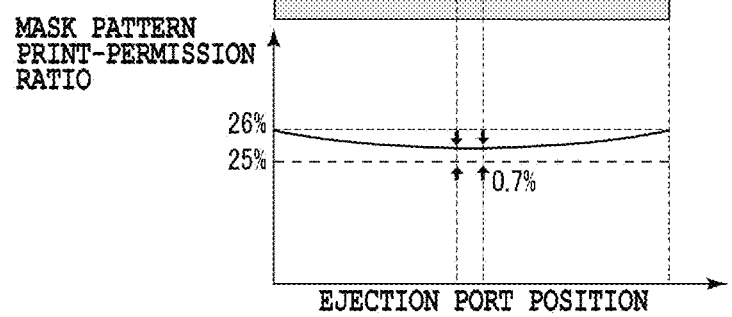
FIGS. 32A to 32C are graphs with the vertical axis representing mask pattern print permission ratio and the horizontal axis representing ejection port position, when printing is performed by the printing method of the sixth embodiment of the invention.
Figure 32B:
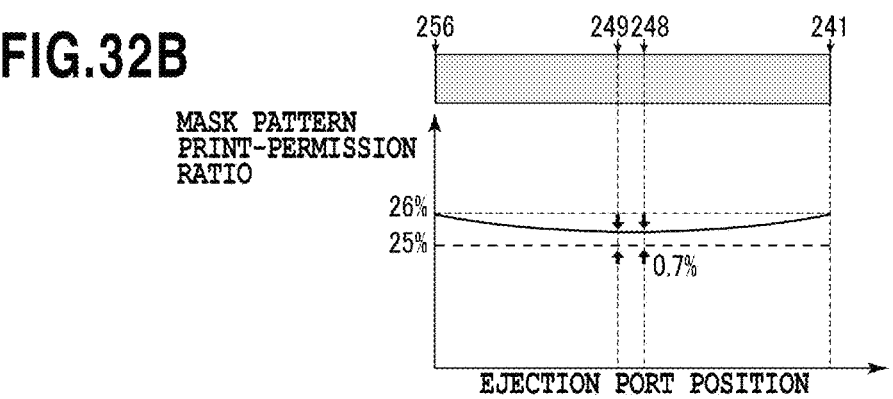
Figure 32C:
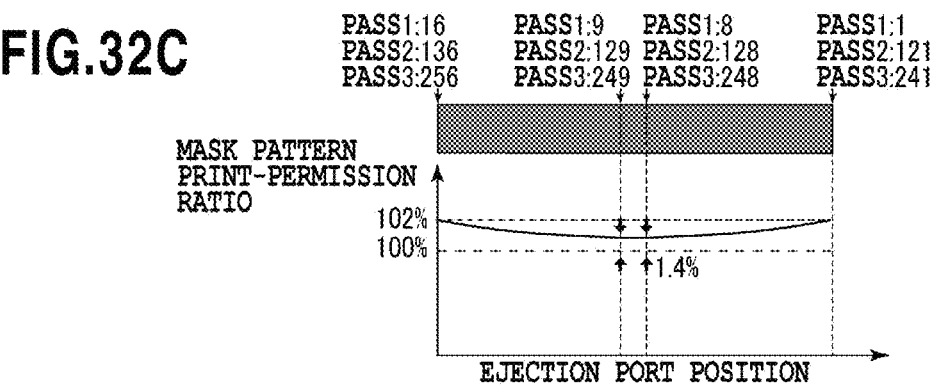

The above will be explained in further detail using FIGS. 32A to 32C. FIG. 32A illustrates mask pattern print permission ratio along the direction of alignment of ejection ports 1 to 16 of the 3-pass mask 261. The dotted line is a 3-pass mask at which double impacts are not carried out, and the solid line is the 3-pass mask 261 at which double impacts are carried out. The mask pattern print permission ratio, from ejection port 1 to ejection port 16, of the 3-pass mask for the case where double impacts are not carried out, is a uniform 25%. In contrast, with respect to the 3-pass mask 261 for the case where double impacts are performed, the print permission ratio of the mask pattern of ejection port 1 and ejection port 16 is 26%, gradually decreases towards the central portion of the ejection port array, where, at around ejection port 8 and ejection port 9, print permission ratio of the mask pattern becomes 25.7%. The difference in mask pattern print permission ratio between the 3-pass mask at which double impacts are not carried out and the 3-pass mask at which double impacts are carried out is its largest, 1%, at ejection port 1 and ejection port 16, decreases as heading toward the central portion of the mask, and the difference is at its smallest, 0.7%, at ejection ports 8 and 9. That is, the mask is setup such that more double impact pixels are generated at the end portions, using ejection port 1 and ejection port 16, than at ejection port 8 and ejection port 9. FIG. 32B is a diagram that, from ejection port 241 to 256, illustrates mask pattern print ratio, along the direction of alignment of the ejection ports, of a 3-pass mask at which double impacts are not carried out (dotted line), and of the 3-pass mask 263 at which double impacts are carried out (solid line). Explanation has been omitted because each of them are the same as a mirror image of the 3-pass mask 221 and the 3-pass mask 261. FIG. 32C illustrates mask pattern print permission ratio along the direction of the ejection port array, where the respective 3-pass masks used for printing the print image via 3 scans have been combined. The mask pattern print permission ratio at combined 3-pass mask for the case where double impacts have not been carried out (dotted line) is a uniform 100%. In contrast, the mask pattern ratio at the combination of the 3-pass masks 261 to 263, at which double impacts are carried out (solid line), is 101.4% at the area printed using the mask central portion, and becomes 102% at the area printed using the mask ends. As a result, at the area printed using the 3-pass masks 261 to 263 at which double impacts are carried out, 100% of the image is completed by complementing the 3-pass masks 261 to 263 to 100% via 3 passes. In addition to this, at the area of the 3 pass area at which the central vicinities of the masks are used, double impacts are carried out at a print permission ratio of 1.4% (0.7% of the 3-pass mask 261 and 0.7% of the 3-pass mask 263). And, at the area of the 3 pass area at which the end portions of the masks are used, double impacts are carried out at a print permission ratio of 2% (1% of the 3-pass mask 261 and 1% of the three pass mask 263).

Figure 33A:
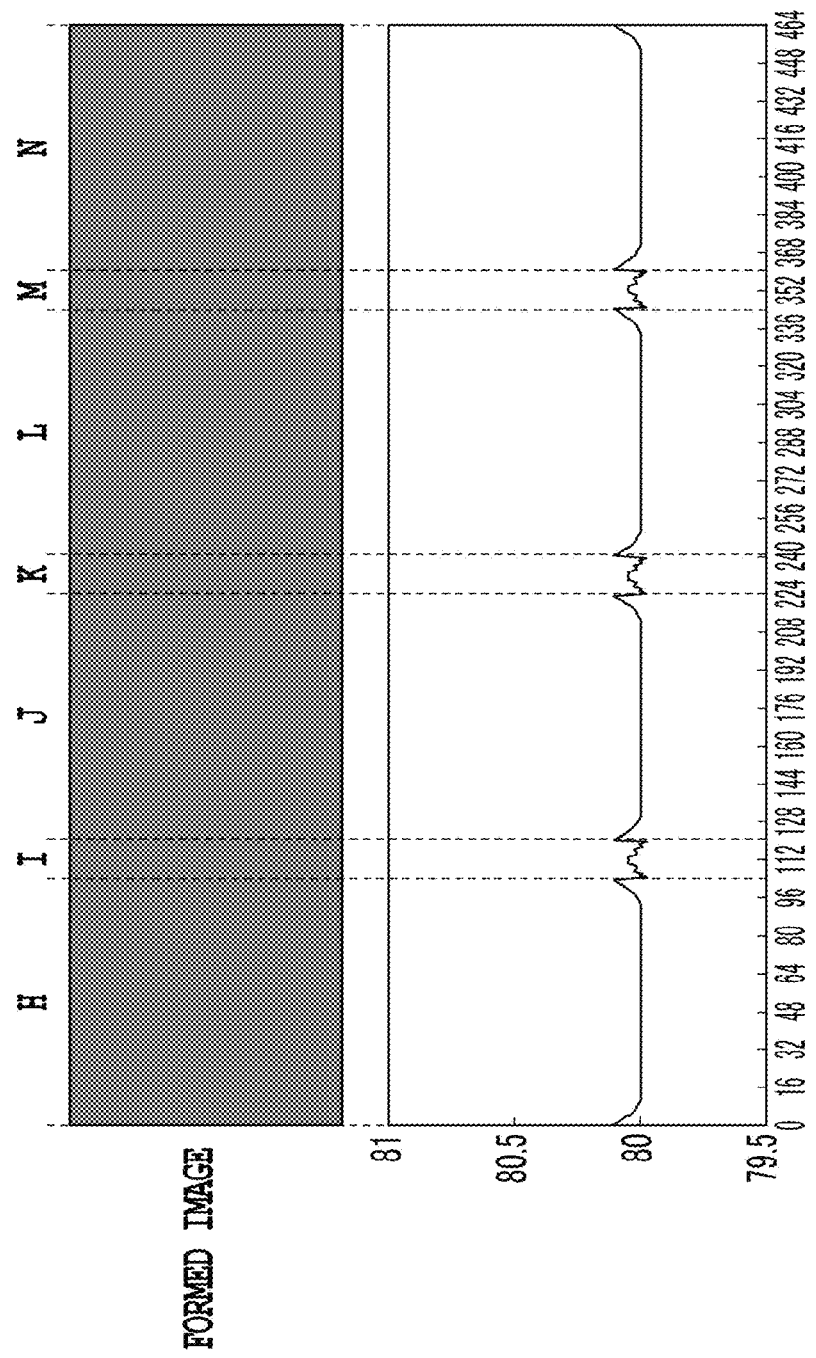
FIG. 33A is a plan view of the print image when printing is performed by the printing method of the sixth embodiment of the invention, and also illustrates a corresponding graph with the vertical axis representing lightness and the horizontal axis representing position on the print medium.

An image formed when double impacts have been performed, using the above described 3-pass masks 261 to 263, and its corresponding luminosity distribution, are shown at FIG. 33A. As shown at FIG. 33A, lightness variation is comparatively suppressed at print areas I, K, and M, where the image is formed by 3-pass printing. This shows that, with respect to dot diameter decreasing, lightness has been compensated for via the addition of double impact locations.

As a result, by using the 3-pass masks 261 to 263 introduced in the present embodiment, even in the case where a dot diameter range is generated in the direction of the ejection ports due to head temperature rise, it is possible to suppress the whitening phenomenon from occurring at the 3-pass print area.

As described above, in the present embodiment, in the printing of the area printed by 3 passes, the number of ink drops ejected at one scan from the end vicinity ejection port group is uniform along the direction of alignment of the ejection ports. And, print control is carried out such that there are more pixels having an increased number of ink impacts at the same location at locations of the print area printed by 3 passes that are near the ends of the alignment direction of the ejection port array than there are at locations of that area near the center of the alignment direction.

With respect to generating double impact locations at the overlapping portion, in contrast to the 5th embodiment where the double impact generation rate is high at the centers of the overlapping portions, in the 6th embodiment the double impact generation rate is high at the ends of the overlapping portions. With respect to the section within the overlapping portion at which it is good to set the double impact generation rate higher, it can be said that the middle is comparatively good when the end portion mask slope is steep, and that the ends are comparatively good when it is gradual. For example, even where there is a mask duty inclination at the end portion, it is preferable to apply the printing method of the 6th embodiment when that inclination is very gentle.

However, because double impact generation rate has many aspects that are dependent on the relationship between mask type and print head temperature rise characteristics, it is most preferable to make a suitable selection for each print head, or for respective print modes of differing masks or differing print head driving frequencies. In this manner, in the case where an ink jet printing apparatus has multiple print modes of differing print duties, pixels having an increased number of ink impacts at the same location are formed by the respective print modes of differing duties. Thus printing may be carried out such that, for each printing mode, the location of pixels at which the number of ink impacts at the same location is increased differs.

On the other hand, an image formed when printing is performed by an array of 1 pl ejection ports, by a printing method in which double impacts are not carried out, in a state where dot diameter distribution has occurred along the direction of the ejection port array as described above, is shown at FIG. 33B, along with the corresponding lightness distribution. As shown at FIG. 33B, it can be seen that lightness is high at the image areas P, R and T, formed by 3 passes. This is because the extent to which the white of the undercoat appears has increased as the ink coverage rate has decreased, because these areas are printed using ejection ports ejecting ink drop having small dot diameter at the end vicinities of an ejection port array, where ejection port temperature rise is small. And, it can be understood that, within the print regions P, R and T, lightness has increased more at the area around where ejection port 1 and ejection port 256 are used than at the area where ejection port 8 and ejection port 248 are used. At the central portion of the print areas P, R and T, ejection port 8 (and ejection port 9), ejection port 128 (and ejection port 129) and ejection port 248 (and ejection port 249) are used. And, at the end portions of the print areas P, R ant T, ejection port 1 (and ejection port 16), ejection port 121 (and ejection port 136), and ejection port 241 (and ejection port 256) are used. Even though the printing duty of 25% does not vary inside the overlapping portions, it can be thought that this is because dot diameters are small and density is low, because ejection port temperature rise is small at the end vicinities of the ejection port array. As described at the first embodiment, differences in heat dissipation properties along the direction of alignment of the ejection ports exist as a reason for the occurrence of a range of temperature increases within an ejection port array. Because heat dissipation occurs in three dimensions, temperature distribution within an ejection port array will follow a function on the order of degree 1 or higher. As a result, at image areas P, R, and T, the edge vicinity of the overlapping areas that use the vicinity of ejection port 1 (and ejection port 16) and the vicinity of ejection port 241 (and ejection port 256) becomes whiter.

It should be noted that in this specification "printing" is not used exclusively to indicate the formation of information containing meaning, such as characters, graphics, etc.; it is used without regard to whether the printed matter has meaning or does not have meaning. Furthermore, it also broadly expresses the formation of an image, figure or pattern, etc., on a print medium without regard to whether it is actualized as an object that can visually perceived by a human being, and also broadly expresses the processing of a print medium.

"Printing apparatus" includes apparatuses, such as printers, all-in-one printers, copy machines and facsimile machines, which have a printing function, and also manufacturing equipment that produces goods while using ink jet printing technology.

"Print medium" expresses not only common sheets used in printing apparatus, but also includes a variety of materials that are capable of receiving ink, such as cloth, textile, plastic film, metal plates, glass, ceramics, wood and leather.

Furthermore, the definition of "ink" (also referred to as "fluid") should also be broadly interpreted similarly to the definition of "printing" above. Ink is any fluid that can be employed to form an image, figure or pattern by being applied to a print medium, or that can be employed in the processing of a print medium, or that can be employed for the processing of ink (e.g., coagulation or insolubilization of color materials in ink applied to a print medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2010-172568, filed Jul. 30, 2010, and 2010-172569, filed Jul. 30, 2010, and 2011-156835, filed Jul. 15, 2011, which are hereby incorporated by reference herein in their entirety.

What is claimed is:

1. An ink jet printing method for printing an image on a print medium by ejecting ink from a print head, on which a plurality of ejection ports are aligned, based on print permitting ratios which indicate whether or not ejection of ink is permitted, comprising the steps of:
    printing a first part of the image with a plurality of scans of the print head to a first area on the print medium by using ejection ports located at ends of the print head in at least one scan; and
    printing a second part of the image with a plurality of scans of the print head to a second area on the print medium without using ejection ports located at the ends of the print head,
    wherein a sum of the print permitting ratios in the plurality of scans to the first area is larger than a sum of the print permitting ratios in the plurality of scans to the second area.

2. The ink jet printing method according to claim 1, wherein the number of scans to the first area is larger than the number of scans to the second area.

3. The ink jet printing method according to claim 1, wherein based on first mask patterns corresponding to print permitting ratios to the first area in the plurality of scans, data for printing in each of the plurality of scans to the first area is generated, and wherein based on second mask patterns corresponding to print permitting ratios to the second area in the plurality of scans, data for printing in each of the plurality of scans to the second area is generated.

4. The ink jet printing method according to claim 3, wherein the print permitting ratios corresponding to the first area are respective duty in each of the first mask patterns, and wherein the print permitting ratios corresponding to the second area are respective duty in each of the second mask patterns.

5. The ink jet printing method according to claim 4, wherein the sum of respective duty in each of the first mask patterns is larger than 100%, and wherein the sum of respective duty in each of the second mask patterns is 100%.

6. The ink jet printing method according to claim 1, wherein the number of scans to the first area is the same as the number of scans to the second area.

7. The ink jet printing method according to claim 1, wherein the number of scans to the first area is three, and the number of scans to the second area is two.

8. An ink jet printing method for printing an image on a print medium by ejecting ink from a print head having a first ejection port array and a second ejection port array that ejects ink of the same color as the first ejection port array, the ejection port arrays being aligned in a scanning direction, based on print permitting ratios which indicate whether or not ejection of ink is permitted, comprising the steps of:
    printing a first part of the image to a first area on the print medium with the print head by using ejection ports located at ends of the first and second ejection port arrays in at least one scan; and
    printing a second part of the image to a second area on the print medium with the print head without using ejection ports located at the ends of the first and second ejection port arrays,
    wherein a sum of the print permitting ratios to the first area is larger than a sum of the print permitting ratios to the second area.

9. The ink jet printing method according to claim 8, wherein the image is printed to the first and second areas by one scan of the print head.

10. The ink jet printing method according to claim 8, wherein the print permitting ratio corresponding to the first area is larger than 100%, and wherein the print permitting ratio corresponding to the second area is 100%.

* * * * *